(12) United States Patent
Yoshida

(10) Patent No.: US 8,909,809 B2
(45) Date of Patent: Dec. 9, 2014

(54) DELIVERY SYSTEM, DELIVERY METHOD, SERVER DEVICE, PROGRAM, AND CLIENT DEVICE

(75) Inventor: Hiroshi Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 367 days.

(21) Appl. No.: 13/145,083

(22) PCT Filed: Jan. 14, 2010

(86) PCT No.: PCT/JP2010/000158
§ 371 (c)(1),
(2), (4) Date: Jul. 18, 2011

(87) PCT Pub. No.: WO2010/087113
PCT Pub. Date: Aug. 5, 2010

(65) Prior Publication Data
US 2011/0276714 A1    Nov. 10, 2011

(30) Foreign Application Priority Data

Jan. 27, 2009 (JP) .................................. 2009-15262

(51) Int. Cl.
| | |
|---|---|
| G06F 15/16 | (2006.01) |
| H04N 21/234 | (2011.01) |
| H04N 21/24 | (2011.01) |
| H04N 21/44 | (2011.01) |

(52) U.S. Cl.
CPC ... *H04N 21/44004* (2013.01); *H04N 21/23406* (2013.01); *H04N 21/24* (2013.01)
USPC .............................. 709/233; 725/90; 370/230

(58) Field of Classification Search
CPC ............ H04N 21/23406; H04N 21/24; H04N 21/44004; H04L 47/10
USPC ............ 709/201, 233; 386/83, 46; 375/40.08; 725/90; 370/230
See application file for complete search history.

(56) References Cited

U.S. PATENT DOCUMENTS

2002/0003941 A1*  1/2002  Hatae et al. ..................... 386/46
2003/0223494 A1* 12/2003  Kurauchi ................. 375/240.08

(Continued)

FOREIGN PATENT DOCUMENTS

| JP | 9-294267 A | 11/1997 |
|---|---|---|
| JP | 11-262008 A | 9/1999 |

(Continued)

OTHER PUBLICATIONS

International Search Report for PCT/JP2010/000158 mailed May 11, 2010.
The Extended European Search Report of EP Application No. 10735585.1 dated Sep. 10, 2014.

*Primary Examiner* — Jungwon Chang
(74) *Attorney, Agent, or Firm* — Sughrue Mion, PLLC

(57) ABSTRACT

A server device is configured to be able to transmit content data having one of a plurality of bit rates. While receiving the content data, a client device stores a received portion thereof and reproduces content based on the stored data. A delivery system acquires a period of time during which content can be reproduced (remaining reproduction time) based on a portion of the stored data that has not been reproduced. The delivery system calculates, according to a predetermined procedure, a correction amount for correcting the bit rate based on the remaining reproduction time, and changes the bit rate based on the calculated correction amount. When the bit rate is within a predetermined range, the delivery system calculates a correction amount having a smaller magnitude than a magnitude of the correction amount calculated according to the procedure.

36 Claims, 12 Drawing Sheets

(56) References Cited

U.S. PATENT DOCUMENTS

| | | |
|---|---|---|
| 2006/0165166 A1 | 7/2006 | Chou et al. |
| 2007/0140651 A1* | 6/2007 | Hashimoto et al. ............. 386/83 |
| 2009/0060448 A1* | 3/2009 | Hosokawa ...................... 386/46 |
| 2012/0150936 A1* | 6/2012 | Yoshida ........................ 709/201 |

FOREIGN PATENT DOCUMENTS

| | | |
|---|---|---|
| JP | 2004172830 A | 6/2004 |
| JP | 2007312051 A | 11/2007 |
| JP | 2008301309 A | 12/2008 |
| WO | 2008108379 A | 9/2008 |

* cited by examiner

DELIVERY SYSTEM, DELIVERY METHOD, SERVER DEVICE, PROGRAM, AND CLIENT DEVICE

TECHNICAL FIELD

This invention relates to a delivery system including a server device for transmitting content data, and a client device for reproducing content represented by received content data.

BACKGROUND ART

A delivery system is known which includes a server device and a client device configured to be communicable with each other. The server device is configured to be able to transmit, to the client device, content data in which a piece of content is encoded at an arbitrary one of a plurality of different bit rates.

While receiving the content data transmitted by the server device, the client device stores the received data of the content data in a storage device and reproduces the content based on the stored data.

One of this type of delivery systems is described in Patent Document 1. The delivery system changes the bit rate of content data transmitted by a server device, based on a portion of data stored in the storage device of a client device that has not been reproduced, such that the remaining reproduction time during which content can be reproduced is approximated to a target value.

This makes it possible to maintain the remaining reproduction time in an appropriate range. Therefore, the content reproduction by the client device can be prevented from being interrupted by the remaining reproduction time becoming too short. Further, the data amount stored in the storage device of the client device can be prevented from being increased excessively by the remaining reproduction time becoming too long.

Patent Document 1: Japanese Laid-Open Patent Publication No. 2004-172830

SUMMARY

However, according to the delivery system described above, the bit rate at which the client device reproduces the content fluctuates frequently. This poses a problem that the user's quality of experience (QoE) that represents a service quality perceived by a viewer of the content is deteriorated excessively.

It is therefore an object of this invention to provide a delivery system capable of solving the above-mentioned problem of excessive deterioration of the user's quality of experience when the remaining reproduction time is maintained in an appropriate range.

In order to achieve this object, an aspect of this invention relates to a delivery system including a server device and a client device which are configured to be communicable with each other.

The server device is configured to be able to transmit, to the client device, content data in which a piece of content is encoded at an arbitrary one of a plurality of different bit rates, and the client device is configured to, while receiving content data transmitted by the server device, store received data of the content data in its storage device and reproduce the content based on the stored data.

In addition, the delivery system comprises: remaining reproduction time acquisition means for acquiring remaining reproduction time that is a period of time during which the content can be reproduced based on a portion of the data stored in the storage device of the client device that has not been reproduced; and bit rate changing means for calculating, according to a predetermined correction amount calculation procedure, a correction amount for correcting the bit rate of the content data transmitted by the server device based on the acquired remaining reproduction time and a preset target value so as to approximate the remaining reproduction time to the target value, and changing the bit rate based on the calculated correction amount.

The bit rate changing means is configured to calculate, when the bit rate is within a predetermined correction amount reducing range, a correction amount having a smaller magnitude than a magnitude of the correction amount calculated according to the correction amount calculation procedure.

Another aspect of this invention relates to a delivery method applicable to a delivery system including a server device configured to be able to transmit content data in which a piece of content is encoded at an arbitrary one of a plurality of different bit rates, and a client device configured to be communicable with the server device.

This delivery method comprises: transmitting the content data to the client device by the server device; while receiving the content data transmitted by the server device, storing received data of the content data in a storage device and reproducing the content based on the stored data, by the client device; acquiring remaining reproduction time that is a period of time during which the content can be reproduced based on a portion of the data stored in the storage device of the client device that has not been reproduced; when the bit rate is not within a predetermined correction amount reducing range, calculating a correction amount for correcting the bit rate of content data transmitted by the server device according to a predetermined correction amount calculation procedure based on the acquired remaining reproduction time and a preset target value so as to approximate the remaining reproduction time to the target value, and when the bit rate is within the correction amount reducing range, calculating a correction amount for correcting the bit rate of content data transmitted by the server device based on the acquired remaining reproduction time and the target value so as to approximate the remaining reproduction time to the target value, the correction amount having a smaller magnitude than a magnitude of the correction amount calculated according to the correction amount calculation procedure; and changing the bit rate of the content data transmitted by the server device based on the calculated correction amount.

Another aspect of this invention relates to a server device configured to be communicable with a client device.

This server device is configured to be able to transmit to the client device content data in which a piece of content is encoded at an arbitrary one of a plurality of different bit rates, and comprises: remaining reproduction time receiving means for receiving, from the client device, remaining reproduction time that is a period of time during which the content can be reproduced based on a portion of data stored in a storage device for storing data of the content data received by the client deice, the portion having not been reproduced by the client device; and bit rate changing means for calculating, according to a predetermined correction amount calculation procedure, a correction amount for correcting the bit rate of content data transmitted to the client device based on the received remaining reproduction time and a preset target value so as to approximate the remaining reproduction time to the target value, and changing the bit rate based on the calculated correction amount.

Additionally, the bit rate changing means is configured to calculate, when the bit rate is within a predetermined correction amount reducing range, a correction amount having a smaller magnitude than a magnitude of the correction amount calculated according to the correction amount calculation procedure.

Still another aspect of this invention relates to a program comprising instructions for causing a server device, which is configured to be communicable with a client device and to be able to transmit to the client device content data in which a piece of content is encoded at an arbitrary one of a plurality of different bit rates, to realize: remaining reproduction time receiving means for receiving, from client device, remaining reproduction time that is a period of time during which the content can be reproduced based on a portion of the data stored in a storage device for storing data of the content data received by the client deice, the portion having not been reproduced by the client device; and bit rate changing means for calculating, according to a predetermined correction amount calculation procedure, a correction amount for correcting the bit rate of content data transmitted to the client device based on the received remaining reproduction time and a preset target value so as to approximate the remaining reproduction time to the target value, and changing the bit rate based on the calculated correction amount.

In addition, the bit rate changing means is configured to calculate, when the bit rate is within a predetermined correction amount reducing range, a correction amount having a smaller magnitude than a magnitude of the correction amount calculated according to the correction amount calculation procedure.

Still another aspect of this invention relates to a client device configured to be communicable with a server device which is configured to be able to transmit content data in which a piece of content is encoded at an arbitrary one of a plurality of different bit rates.

Further, this client device is configured to, while receiving content data transmitted by the server device, store received data of the content data in its storage device and reproduce the content based on the stored data, and comprises: remaining reproduction time acquisition means for acquiring remaining reproduction time that is a period of time during which the content can be reproduced based on a portion of the data stored in the storage device that has not been reproduced; and bit rate change request transmission means for calculating, according to a predetermined correction amount calculation procedure, a correction amount for correcting the bit rate of the content data transmitted by the server device based on the acquired remaining reproduction time and a preset target value so as to approximate the remaining reproduction time to the target value, and transmitting, to the server deice, a bit rate change request for changing the bit rate based on the calculated correction amount.

In addition, the bit rate change request transmission means is configured to calculate, when the bit rate is within a predetermined correction amount reducing range, a correction amount having a smaller magnitude than a magnitude of the correction amount calculated according to the correction amount calculation procedure.

Still another aspect of this invention relates to a program comprising instructions for causing a client device which is configured to be communicable with a server device which is configured to be able to transmit to the client device content data in which a piece of content is encoded at an arbitrary one of a plurality of different bit rates, the client device being configured to, while receiving content data transmitted by the server device, store received data of the content data in its storage device and reproduce the content based on the stored data, to realize: remaining reproduction time acquisition means for acquiring remaining reproduction time that is a period of time during which the content can be reproduced based on a portion of the data stored in the storage device that has not been reproduced; and bit rate change request transmission means for calculating, according to a predetermined correction amount calculation procedure, a correction amount for correcting the bit rate of the content data transmitted by the server device based on the acquired remaining reproduction time and a preset target value so as to approximate the remaining reproduction time to the target value, and transmitting, to the server deice, a bit rate change request for changing the bit rate based on the calculated correction amount.

In addition, the bit rate change request transmission means is configured to calculate, when the bit rate is within a predetermined correction amount reducing range, a correction amount having a smaller magnitude than a magnitude of the correction amount calculated according to the correction amount calculation procedure.

The configuration of this invention as described above makes it possible to prevent excessive deterioration of the user's quality of experience while maintaining the remaining reproduction time in an appropriate range.

EXEMPLARY EMBODIMENTS

Referring to FIGS. 1 to 12, description will be made of exemplary embodiments of a delivery system, a delivery method, a server device, a program, and a client device according to this invention.

<First Embodiment>

Figure 1:
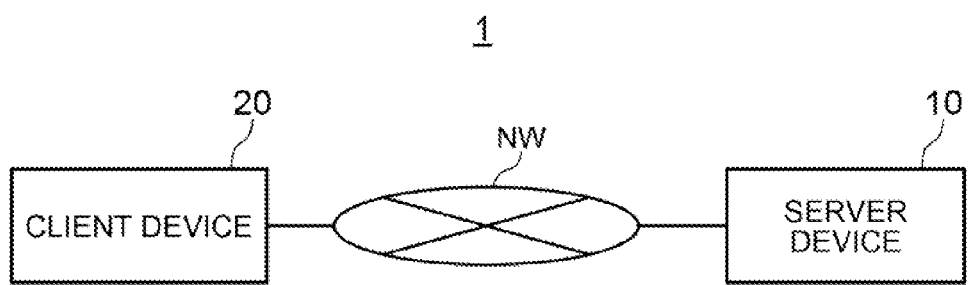
FIG. 1 is a drawing illustrating a schematic configuration of a delivery system according to a first embodiment of this invention.

As shown in FIG. 1, a delivery system 1 according to a first embodiment includes a server device 10 and a client device 20. The server device 10 and the client device 20 are communicably connected to each other through a communication network NW (e.g. the Internet).

The server device 10 has a central processing unit (CPU) and a storage device (memory and hard disk drive (HDD)) both not shown in the diagram. The server device 10 is configured to realize the functions as described later by the CPU executing a program stored in the storage device.

The client device 20 is a personal computer. The client device 20 may be a portable telephone device, a car navigation device, a television receiver, a set-top box, or a game device. The client device 20 has a central processing unit (CPU), a storage device (memory), an input device (e.g. a keyboard, a mouse or the like) and an output device (e.g. a display, a speaker or the like) not shown in the diagram. The client device 20 is configured to realize the functions as described later by the CPU executing a program stored in the storage device.

Figure 2:
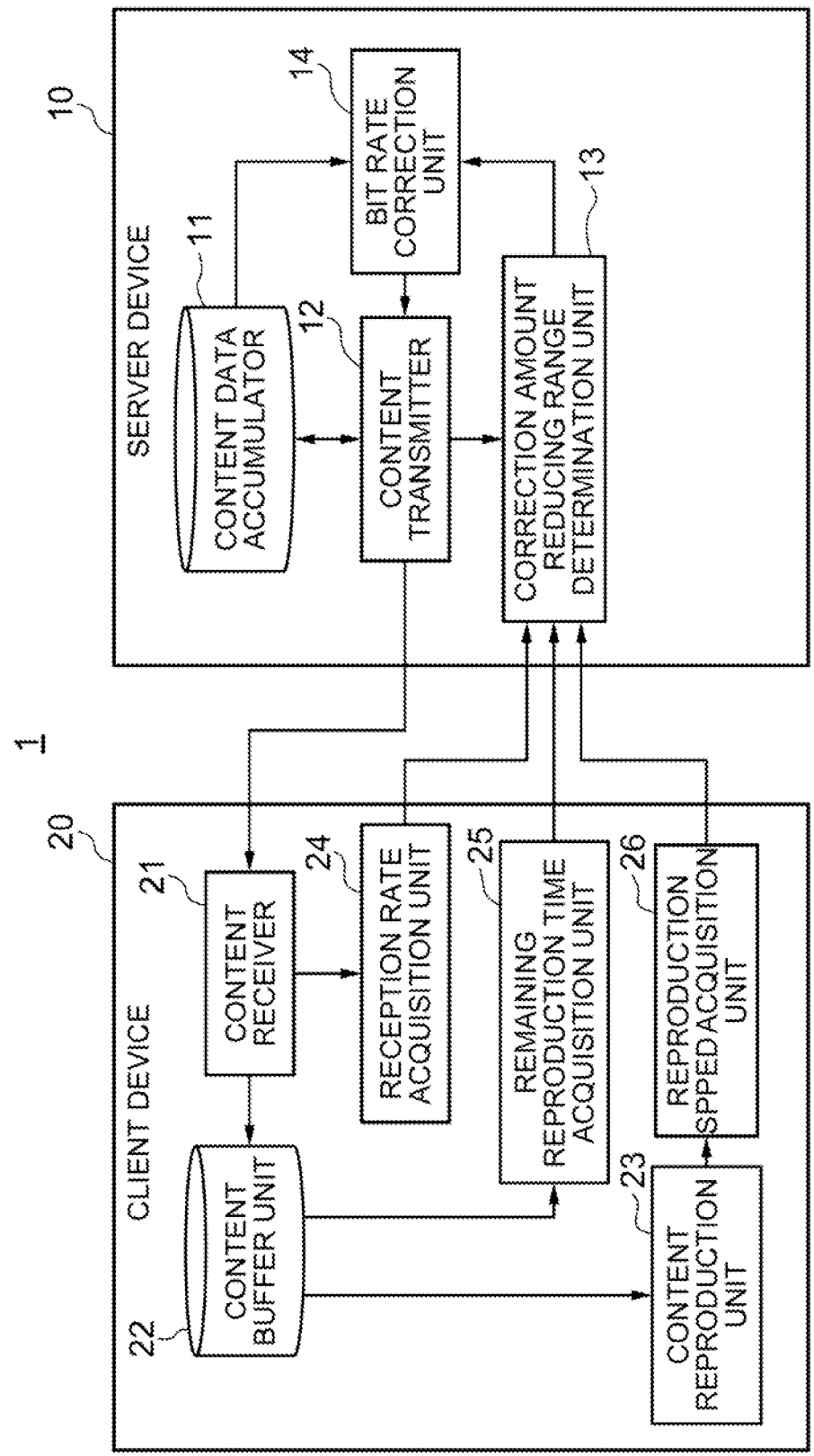
FIG. 2 is a block diagram schematically illustrating functions of the delivery system according to the first embodiment of this invention.

FIG. 2 is a block diagram illustrating functions of the delivery system 1 configured as described above.

Functions of the server device 10 include a content data accumulator 11, a content transmitter 12, a correction amount reducing range determination unit (part of bit rate changing means, remaining reproduction time receiving means, reception rate receiving means, reproduction speed receiving means) 13, and a bit rate correction unit (part of bit rate changing means) 14. The content data accumulator 11 is realized by the storage device of the server device 10. The content transmitter 12, the correction amount reducing range determination unit 13, and the bit rate correction unit 14 are realized by the CPU of the server device 10 executing a program represented by the flowchart shown in FIG. 6 as described later.

Functions of the client device 20 include a content receiver 21, a content buffer 22, a content reproduction unit 23, a reception rate acquisition unit (reception rate acquisition means) 24, a remaining reproduction time acquisition unit (remaining reproduction time acquisition means) 25, and a reproduction speed acquisition unit (reproduction speed acquisition means) 26. These functions are realized by the CPU of the client device 20 executing a program represented by the flowchart of FIG. 5 as described later.

The functions will be described more specifically below.

The content data accumulator 11 of the server device 10 preliminarily stores (accumulates) content data in which a piece of content (for example, information representing video or audio) is encoded at one of a plurality of different bit rates. The bit rate as used herein indicates a size of data required for reproducing the content at a normal speed (for reproducing at single-speed).

The content transmitter 12 of the server device 10 transmits content data stored in the content data accumulator 11 to the client device 20. In this embodiment, the content transmitter 12 receives a content transmission request from the client device 20 and transmits content data specified by the received content transmission request to the client device 20.

The content transmitter 12 may be configured to generate, based on the content data stored in the content data accumulator 11, content data encoded at a bit rate which is different from that of the content data stored in the content data accumulator 11.

As described above, the server device 10 is configured to be able to transmit to the client device 20 content data in which a piece of content is encoded at an arbitrary bit rate of a plurality of different bit rates.

The content receiver 21 of the client device 20 receives content data transmitted by the server device 10.

Meanwhile the content data is received by the content receiver 21, the content buffer 22 of the client device 20 stores in the storage device the received data of the content data that is being received.

The content reproduction unit 23 of the client device 20 reproduces the content based on the data stored in storage device (through an output device). The content reproduction unit 23 further includes a function to change the reproduction speed at which the content is reproduced, according to an instruction from a user.

Thus, the client device 20 is configured to, while receiving content data transmitted by the server device 10, store received data of the content data in the storage device, and reproduce the content based on the stored data (that is, to perform streaming reproduction).

The reception rate acquisition unit 24 of the client device 20 acquires a reception rate that is a size of content data (data amount or data size) received by the content receiver 21 per unit time.

In this embodiment, the reception rate acquisition unit 24 acquires a value of the reception rate by obtaining instantaneous reception rates at a plurality of different time points and averaging the instantaneous reception rates obtained. The value of each instantaneous reception rate is obtained by dividing a data size of content data received within a predetermined measurement time by the measurement time. The reception rate acquisition unit 24 may be configured to acquire an instantaneous reception rate obtained at a certain time point, as the reception rate. Further, the reception rate acquisition unit 24 may be configured to acquire a reception rate based on instantaneous reception rates obtained at a plurality of different time points and a filter (e.g. a Kalman filter).

The reception rate acquisition unit 24 further transmits the acquired reception rate as part of receiver-side information, to the server device 10.

The remaining reproduction time acquisition unit 25 of the client device 20 acquires remaining reproduction time that is a period of time during which content can be reproduced by the content reproduction unit 23, based on part of the data stored in the storage device that has not been reproduced (unreproduced data).

In this embodiment, the remaining reproduction time acquisition unit 25 acquires, as the remaining reproduction time, a value obtained by dividing a size of the unreproduced data by a bit rate of the unreproduced data. For instance, when the size of the unreproduced data is 1 [MB] (hereafter, units of physical values shall be bracketed) and the bit rate of the unreproduced data is 1 [Mbps], the remaining reproduction time is 8 [seconds]. When the size of the unreproduced data is 1 [MB] and the bit rate of the unreproduced data is 2 [Mbps], the remaining reproduction time is 4 [seconds].

When the unreproduced data is composed of a plurality of portions having different bit rates, the remaining reproduction time acquisition unit 25 acquires the remaining reproduction time by summing up values obtained by dividing sizes of the portions by the corresponding bit rates. For example, when content data is unreproduced data consisting of a data portion having a bit rate of 1 [Mbps] and a size of 1 [MB], and a data portion having a bit rate of 2 [Mbps] and a size of 1 [MB], the remaining reproduction time acquisition unit 25 acquires the remaining reproduction time of 12 [seconds] by summing 8 [seconds] and 4 [seconds].

The remaining reproduction time acquisition unit 25 further transmits the acquired remaining reproduction time to the server device 10, as part of the receiver-side information.

In addition, the reproduction speed acquisition unit 26 of the client device 20 acquires a reproduction speed that is a speed at which the content is reproduced by the content reproduction unit 23. The reproduction speed acquisition unit 26 further transmits to the server device 10 a reproduction speed ratio that is obtained by dividing the acquired reproduction speed by a reproduction speed corresponding to normal speed reproduction, as part of the receiver-side information.

If the content is reproduced at a normal speed, the reproduction speed ratio is 1. If the content is reproduced at a reproduction speed that is twice the normal speed (double-speed reproduction), the reproduction speed ratio is 2, and if the content is reproduced at a reproduction speed that is half the normal speed (slow reproduction), the reproduction speed ratio is 0.5.

Meanwhile, the correction amount reducing range determination unit 13 of the server device 10 receives the receiver-side information from the client device 20. The receiver-side information includes the reception rate, the remaining reproduction time, and the reproduction speed ratio, as described above.

The correction amount reducing range determination unit 13 determines an upper limit and a lower limit of the correction amount reducing range on the basis of the received receiver-side information and a preset target value for the remaining reproduction time. Description will be made later on derivation of equations, and meanings of variables.

More specifically, the correction amount reducing range determination unit 13 calculates a remaining reproduction time difference $e_p$ [seconds], using the following equation (1).

$$e_p = T_r - T_p \qquad (1)$$

In the equation (1), $T_r$ denotes a target value for preset remaining reproduction time, and $T_p$ denotes a remaining reproduction time included in the received receiver-side information (that is, a current remaining reproduction time at the time when it is acquired by the client device 20).

Subsequently, the correction amount reducing range determination unit 13 calculates time rates of change (time differential values) of remaining reproduction time $\Delta x_{max}$ and $\Delta x_{min}$ based on the calculated remaining reproduction time difference $e_p$ and the following equations (2) to (5).

$$\Delta x_{max} = e_p / \tau_{min.+} \text{ (when } e_p \geq 0) \qquad (2)$$

$$\Delta x_{max} = e_p / \tau_{max.-} \text{ (when } e_p < 0) \qquad (3)$$

$$\Delta x_{min} = e_p / \tau_{max.+} \text{ (when } e_p \geq 0) \qquad (4)$$

$$\Delta x_{min} = e_p / \tau_{min.-} \text{ (when } e_p < 0) \qquad (5)$$

In the equations above, $\tau_{min.+}$ denotes a first time constant in shortage (first delay time in shortage), $\tau_{max.+}$ denotes a second time constant in shortage (second delay time in shortage), $\tau_{min.-}$ denotes a first time constant in excess (first delay time in excess), and $\tau_{max.-}$ denotes a second time constant in excess (second delay time in excess). The first time constant in shortage $\tau_{min.+}$, the second time constant in shortage $\tau_{max.+}$, the first time constant in excess $\tau_{min.-}$ and the second time constant in excess $\tau_{max.-}$ are preliminarily stored in the storage device of the server device 10.

Figure 3:
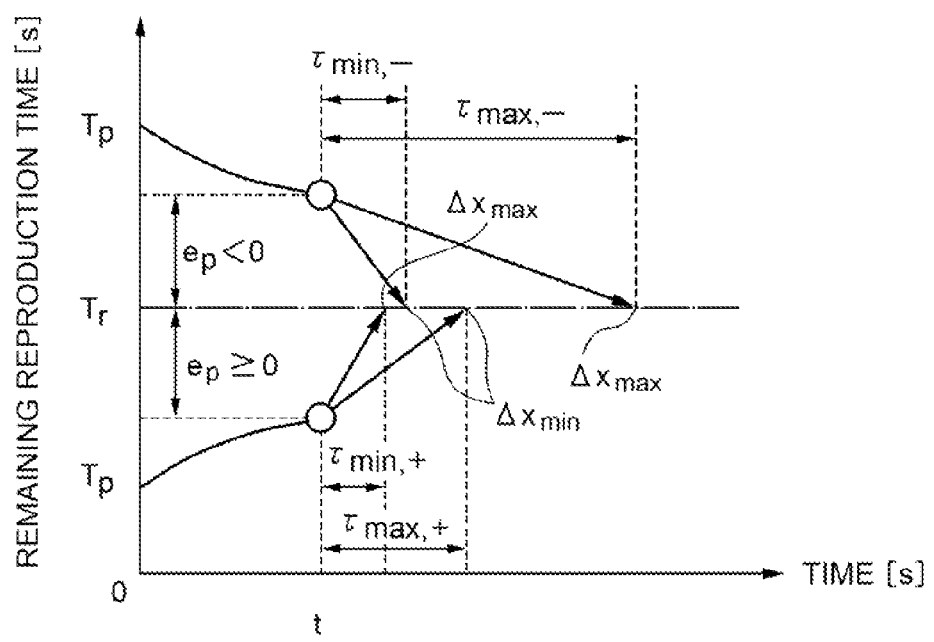
FIG. 3 is an explanatory drawing conceptually illustrating a relationship among four time constants, remaining reproduction time, target value of remaining reproduction time, and time rate of change of media flow rate.

As shown in FIG. 3, the second time constant in shortage $\tau_{max.+}$ is longer than the first time constant in shortage $\tau_{min.+}$. The first time constant in excess $\tau_{min.-}$ is longer than the first time constant in shortage $\tau_{min.+}$. The second time constant in excess $\tau_{max.-}$ is longer than the first time constant in excess $\tau_{min.-}$, and longer than the second time constant in shortage $\tau_{max.+}$.

The correction amount reducing range determination unit 13 calculates media flow rates $x_{max}$ and $x_{min}$, based on the calculated time rates of change $\Delta x_{max}$ and $\Delta x_{min}$ and the following equations (6) and (7). The media flow rates $x_{max}$ and $x_{min}$ each represent a period of time during which the content can be reproduced based on the content data received by the client device 20 per unit time.

$$x_{max} = p + \Delta x_{max} \qquad (6)$$

$$x_{min} = p + \Delta x_{min} \qquad (7)$$

In the equations above, p denotes a reproduction speed ratio included in the received receiver-side information (that is, a reproduction speed ratio corresponding to the current reproduction speed acquired by the client device 20).

Subsequently, the correction amount reducing range determination unit 13 calculates an upper limit $b_{max}$ of the correction amount reducing range and a lower limit $b_{min}$ of the correction amount reducing range based on the calculated media flow rates $x_{max}$ and $x_{min}$, and the following equations (8) and (9).

$$b_{max} = v / x_{min} \qquad (8)$$

$$b_{min} = v / x_{max} \qquad (9)$$

In the equations above, v denotes a reception rate included in the received receiver-side information (that is, a current reception rate acquired by the client device 20).

In this manner, the correction amount reducing range determination unit 13 determines a correction amount reducing range on the basis of the reproduction speed (the reproduction speed ratio corresponding thereto) acquired by the reproduction speed acquisition unit 26, the reception rate acquired by the reception rate acquisition unit 24, and the remaining reproduction time acquired by the remaining reproduction time acquisition unit 25, and the target value. This makes it possible to appropriately set the correction amount reducing range.

The correction amount reducing range determination unit 13 further calculates a first bit rate at which the remaining reproduction time $T_p$ matches the target value $T_r$ after the elapse of the first delay time (the first time constant in shortage $\tau_{min.+}$ or the first time constant in excess $\tau_{min.-}$), and a second bit rate at which the remaining reproduction time $T_p$ matches the target value $T_r$ after the elapse of the second delay time (the second time constant in shortage $\tau_{max.+}$ or the second time constant in excess $\tau_{max.-}$) that is longer than the first delay time. The correction amount reducing range determination unit 13 then determines the greater one of the calculated first bit rate and second bit rate as the upper limit $b_{max}$ of the correction amount reducing range, and determines the smaller one of the first bit rate and the second bit rate as the lower limit $b_{min}$ of the correction amount reducing range.

As seen from the equations (1) to (9), the difference between the upper limit $b_{max}$ and the lower limit $b_{min}$ approaches zero as the remaining reproduction time difference $e_p$ approaches zero. Therefore, it can be said that the correction amount reducing range determination unit 13 is configured to narrow the correction amount reducing range as the remaining reproduction time $T_p$ approaches the target value $T_r$.

This enables the remaining reproduction time $T_p$ to converge more reliably to the target value $T_r$.

Description will be made of derivation of the equations (1) to (9) above, and meanings of the variables.

It is assumed here that the flow of data transmitted from the server device 10 to the client device 20 is a continuum flow.

A reception rate that is a size of content data received by the client device 20 per unit time at a certain time t [seconds] is represented by v(t) [bps]. A bit rate of content data that the client device 20 is receiving at the time t is represented by b(t) [bps].

Then, the following equation (10) is used to calculate ρ(t) [seconds/bit] that is called a media density.

$$\rho = 1/b \tag{10}$$

The media density ρ represents a period of time during which the content can be reproduced based on the data of a unit size in the content data that the client device 20 is receiving at the time t. For example, when the client device 20 is receiving at the time t the content data with a bit rate of 1 [Mbps], $\rho = 1 \times 10^{-6}$ [seconds/bit]. Therefore, the client device 20 is able to reproduce the content for $1 \times 10^{-6}$ [seconds] based on the content data of 1 [bit].

As is seen from the equation (10), content data with a high bit rate (when the content is high image quality video) has a low media density, whereas content data with a low bit rate (when the content is low image quality video) has a high media density.

A period of time ΔT [seconds] during which the content can be reproduced based on the content data received by the client device 20 in an extremely short time Δt is calculated using the following equation (11).

$$\Delta T = \rho v \Delta t \tag{11}$$

In this equation (11), a period of time dT/dt [dimensionless] during which the content can be reproduced based on the content data received by the client device 20 per unit time at the time t is calculated, as shown in the following equation (12) by approximating Δt to zero (by finding a limit value when Δt is approximated to zero).

$$dT/dt = \rho v \tag{12}$$

Substituting dT/dt in the left-hand side of the equation (12) above with x, this x shall be referred to as a media flow rate.

Description will be made of meaning of this media flow rate.

A media flow rate is a dimensionless amount representing a period of time during which the content can be reproduced based on the content data received by the client device 20 per unit time.

When the media flow rate is equal to the reproduction speed ratio p, the period of time available for the client device 20 to reproduce the content at a reproduction speed corresponding to the reproduction speed ratio p based on the content data received by the client device 20 per unit time is equal to this unit time. Accordingly, the remaining reproduction time will not vary.

When the media flow rate is greater than the reproduction speed ratio p, the period of time available for the client device 20 to reproduce the content at a reproduction speed corresponding to the reproduction speed ratio p based on the content data received by the client device 20 per unit time is longer than the unit time. Accordingly, the remaining reproduction time is increased.

In contrast, when media flow rate is smaller than the reproduction speed ratio p, the period of time available for the client device 20 to reproduce the content at a reproduction speed corresponding to the reproduction speed ratio p based on the content data received by the client device 20 per unit time is shorter than the unit time. Accordingly, remaining reproduction time is reduced.

This shows that the media flow rate is a physical value governing the remaining reproduction time.

Description will be made of relationship between media flow rate and remaining reproduction time.

As described before, the media flow rate represents a period of time during which the content can be reproduced based on the content data received by the client device 20 per unit time. Therefore, as shown in the following equation (13), the time differential value $dT_p/dt$ of the remaining reproduction time $T_p$ is equal to a value obtained by subtracting the reproduction speed ratio p from the media flow rate x.

$$dT_p/dt = x - p \tag{13}$$

Figure 4:
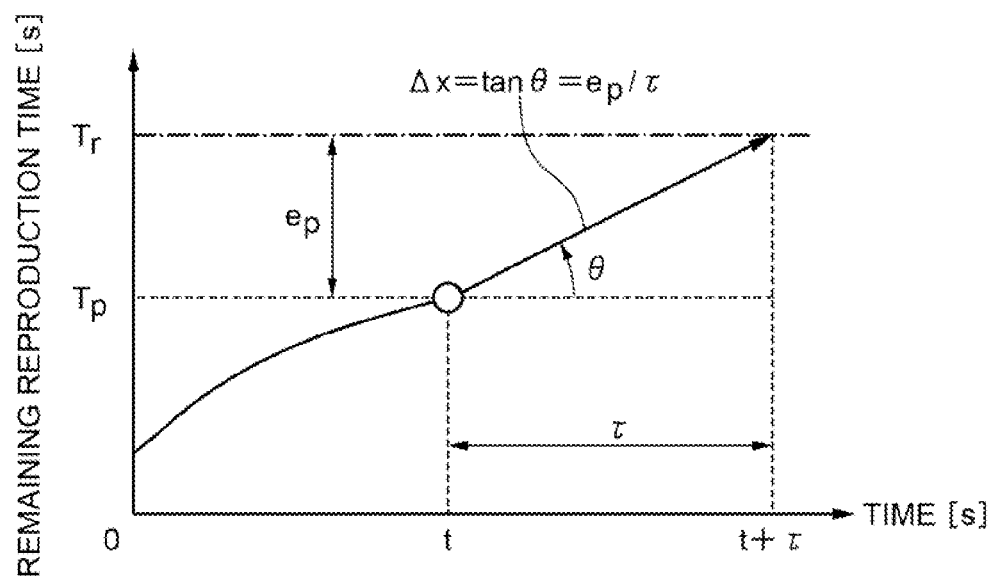
FIG. 4 is an explanatory drawing conceptually illustrating a relationship among time constant, remaining reproduction time, target value of remaining reproduction time, and time rate of change of media flow rate.

Next, referring to FIG. 4, consideration is given how to find a media flow rate x at which the remaining reproduction time $T_p$ matches the target value $T_r$ [seconds] after a delay time τ [seconds] when the remaining reproduction time is $T_p$ [seconds] at a certain time t.

In order that the remaining reproduction time $T_p$ may match the target value $T_r$ after the delay time τ by being linearly increased or decreased, $T_p$ must be increased or decreased at a rate of change that satisfies the equation (14). A value $T_r - T_p$ obtained by subtracting the remaining reproduction time $T_p$ from the target value $T_r$ is used as the remaining reproduction time difference $e_p$. This substitution of $T_r - T_p$ with $e_p$ corresponds to the equation (1) above.

$$dT_p/dt = (T_r - T_p)/\tau = e_p/\tau \tag{14}$$

Since the right-hand side of the equation (13) above is equal to the right-hand side of the equation (14) above, when the remaining reproduction time is $T_p$ [seconds] at a certain time t, the media flow rate x at which the remaining reproduction time $T_p$ matches the target value $T_r$ [seconds] after the delay time [seconds] is calculated by the following equation (15).

$$x = p + e_p/\tau \tag{15}$$

Substituting the right-hand side $e_p/\tau$ of the equation (15) above with the time rate of change Δx of the remaining reproduction time, the equation (15) corresponds to the equation (6) and the equation (7). The substitution of $e_p/\tau$ with Δx corresponds to the equations (2) to (5).

Next, it is explained that the delay time τ [seconds] in the equation (14) above is a time constant indicating a follow-up speed at which the remaining reproduction time $T_p$ follows the target value $T_r$. When the equation (14) is deformed to be written as the following equation (16), it can be seen that the equation (16) is a first-order ordinary differential equation with respect to $T_p$.

$$dT_p/dt = -(T_p - T_r)/\tau \tag{16}$$

Solving the equation (16), the following equation (17) is obtained. In the equation (17), C is an arbitrary constant. It is obvious from the equation (17) that τ is a time constant.

$$T_p = T_r + C \cdot \exp(-t/\tau) \tag{17}$$

Accordingly, when remaining reproduction time $T_p$ [seconds] at a certain time and a target value $T_r$ [seconds] of the remaining reproduction time are given, a media flow rate x [dimensionless] at which the remaining reproduction time $T_p$ matches the target value $T_r$ at the follow-up speed of the time constant τ [seconds] (that is, after the time constant τ [seconds]) can be calculated by using the equation (15) above.

Further, a bit rate b [bps] satisfying (realizing) the media flow rate x is calculated based on the following equation (18). In this equation, v[bps] denotes a size of content data received by the client device 20 per unit time (reception rate). The equation (18) below is derived from the equation (10) and the equation (12). The equation (18) corresponds to the equation (8) and the equation (9).

$$b = v/x \qquad (18)$$

If the delivery system is configured to change a bit rate of content data being transmitted by the server device 10 to a bit rate calculated using the equations (15) and (18) above, the remaining reproduction time can be approximated to the target value.

However, in this case, particularly when content data is to be delivered (transmitted from the server device 10 to the client device 20) via a communication network the communicable band of which varies, the bit rate of content reproduced by the client device 20 will vary frequently. This may extremely deteriorate the user's quality of experience (QoE) that is a service quality a viewer of the content will perceive.

In order to solve this problem, the delivery system 1 determines a correction amount reducing range on the basis of the equations (2) to (9) based on the equations (15) and (18). Further, the delivery system 1 changes the bit rate of content data to be transmitted from then on, only when the bit rate of the content data that is currently transmitted by the server device 10 is out of the correction amount reducing range. Thus, the delivery system 1 is able to suppress excessive variation of the bit rate by not changing the bit rate if the current bit rate is within the correction amount reducing range.

Next, description will be made of a relationship between the upper limit $b_{max}$ and lower limit $b_{min}$ of the correction amount reducing range and the four time constants (i.e. the first time constant in shortage $\tau_{min.+}$, the second time constant in shortage $\tau_{max.+}$, the first time constant in excess $\tau_{min.-}$, and the second time constant in excess $\tau_{max.-}$), with reference to FIG. 3.

Firstly, a relationship between time constant τ and bit rate b will be described.

When the remaining reproduction time difference $e_p$ is a positive value (that is, the remaining reproduction time $T_p$ is smaller than the target value $T_r$) based on the equations (15) and (18) above, the bit rate b becomes higher as the time constant τ becomes greater. In contrast, when the remaining reproduction time difference $e_p$ is a negative value (that is, the remaining reproduction time $T_p$ is greater than the target value $T_r$), the bit rate b becomes lower as the time constant τ becomes greater.

Therefore, when the remaining reproduction time difference $e_p$ is a positive value, as described above, the lower limit $b_{min}$ of the correction amount reducing range is calculated on the basis of the first time constant in shortage $\tau_{min.+}$ (the equations (2), (6) and (9)), and the upper limit $b_{max}$ of the correction amount reducing range is calculated on the basis of the second time constant in shortage $\tau_{max.+}$ that is greater than the first time constant in shortage $\tau_{min.+}$ (the equations (4), (7) and (8)).

When the remaining reproduction time difference $e_p$ is a negative value, the upper limit $b_{max}$ of the correction amount reducing range is calculated on the basis of the first time constant in excess $\tau_{min.-}$ (the equations (5), (7) and (8)), and the lower limit $b_{min}$ of the correction amount reducing range is calculated on the basis of the second time constant in excess $\tau_{max.-}$ that is greater than the first time constant in excess $\tau_{min.-}$ (the equations (3), (6) and (9)).

When the remaining reproduction time difference $e_p$ is a positive value, the probability that reproduction of the content is interrupted due to shortage of the remaining reproduction time is higher than when the remaining reproduction time difference $e_p$ is a negative value. Therefore, the delivery system 1 sets the time constant such that when the remaining reproduction time is smaller than the target value, the remaining reproduction time matches the target value earlier than when the remaining reproduction time is greater than the target value. More specifically, the delivery system 1 sets the second time constant in shortage $\tau_{max.+}$ to a greater value than the second time constant in excess $\tau_{max.-}$ (sets the second delay time in shortage $\tau_{max.+}$ to be longer than the second delay time in excess $\tau_{max.-}$) as described above.

As described later, the server device 10 calculates a correction amount for correcting the bit rate of content data transmitted by the server device 10 so that the remaining reproduction time $T_p$ matches the target value $T_r$ after a period of time within a range from the first time constant in shortage $\tau_{min.+}$ to the second time constant in shortage $\tau_{max.+}$, or within a range from the first time constant in excess $\tau_{min.-}$ to the second time constant in excess $\tau_{max.-}$.

Specifically, when the remaining reproduction time $T_p$ is smaller than the target value $T_r$, the server device 10 calculates a correction amount such that the remaining reproduction time $T_p$ matches the target value $T_r$ earlier than when the remaining reproduction time $T_p$ is greater than the target value $T_r$.

Accordingly, when the remaining reproduction time difference $e_p$ is a positive value, the delivery system 1 is capable of causing the remaining reproduction time $T_p$ to match the target value $T_r$ earlier than when the remaining reproduction time difference $e_p$ is a positive value.

This makes it possible to minimize the possibility of unintended interruption of reproduction of the content when the remaining reproduction time difference $e_p$ is a positive value. On the other hand, fluctuation of the bit rate can be further reduced when the remaining reproduction time difference $e_p$ is a negative value, since the correction amount reducing range can be expanded.

Thus, when the remaining reproduction time $T_p$ is smaller than the target value $T_r$, the correction amount reducing range determination unit 13 calculates a bit rate, as a first bit rate, at which the remaining reproduction time $T_p$ matches the target value $T_r$ after the first delay time in shortage $\tau_{min.+}$. In this case, the correction amount reducing range determination unit 13 further calculates a bit rate, as a second bit rate, at which the remaining reproduction time $T_p$ matches the target value $T_r$ after the second delay time in shortage $\tau_{max.+}$ that is longer than the first delay time in shortage $\tau_{min.+}$.

The correction amount reducing range determination unit 13 determines the greater one of the calculated first bit rate and second bit rate (the first bit rate in this embodiment) as the upper limit $b_{max}$ of the correction amount reducing range, and determines the smaller one of the first bit rate and the second bit rate (the second bit rate in this case) as the lower limit $b_{min}$ of the correction amount reducing range.

When the remaining reproduction time $T_p$ is greater than the target value $T_r$, the correction amount reducing range determination unit 13 calculates a bit rate, as a first bit rate, at which the remaining reproduction time $T_p$ matches the target value $T_r$ after the first delay time in excess $\tau_{min.-}$. In this case, the correction amount reducing range determination unit 13 further calculates a bit rate, as a second bit rate, at which the remaining reproduction time $T_p$ matches the target value $T_r$ after the second delay time in excess $\tau_{max.-}$ that is longer than the first delay time in excess $\tau_{min.-}$ and longer than the second delay time in shortage $\tau_{max.+}$.

The correction amount reducing range determination unit 13 determines the greater one of the calculated first bit rate and second bit rate (the second bit rate in this embodiment) as the upper limit $b_{max}$ of the correction amount reducing range, and determines the smaller one of the first bit rate and the second bit rate (the first bit rate in this embodiment) as the lower limit $b_{min}$ of the correction amount reducing range.

Next, other functions of the delivery system 1 will be described.

The bit rate correction unit 14 calculates a correction amount for correcting a bit rate of content data transmitted by the content transmitter 12, based on the upper limit $b_{max}$ of the correction amount reducing range and the lower limit $b_{min}$ of the correction amount reducing range both determined by the correction amount reducing range determination unit 13.

Specifically, the bit rate correction unit 14 calculates a bit rate difference $e_b$ based on the following equations (19) to (21).

$$e_b = b_{max} - b \text{ (if } b > b_{max}) \tag{19}$$

$$e_b = 0 \text{ (if } b_{min} \leq b \leq b_{max}) \tag{20}$$

$$e_b = b_{min} - b \text{ (if } b < b_{min}) \tag{21}$$

More specifically, when the bit rate b of the content data currently transmitted by the content transmitter 12 is smaller than the lower limit $b_{min}$, the bit rate correction unit 14 calculates a value $b_{min} - b$ by subtracting the bit rate b from the lower limit $b_{min}$, as the bit rate difference $e_b(=b_{min}-b)$.

When the bit rate b is greater than the upper limit the bit rate correction unit 14 calculates a value $b_{max} - b$ by subtracting the bit rate b from the upper limit $b_{max}$ as the bit rate difference $e_b(=b_{max}-b)$.

When the bit rate b is equal to or greater than the lower limit $b_{min}$ and is equal to or smaller than the upper limit $b_{max}$, the bit rate correction unit 14 sets the bit rate difference $e_b$ to zero (that is, the bit rate difference $e_b$ is set to zero). As described later, the setting of the bit rate difference $e_b$ to zero corresponds to setting of the correction amount for the bit rate to zero. Thus, it can be said that the bit rate correction unit 14 sets the correction amount to zero when the bit rate is within the correction amount reducing range.

Subsequently, the bit rate correction unit 14 calculates a correction amount baseline value $\Delta b$ based on the calculated bit rate difference $e_b$ and the following equation (22).

$$\Delta b = K_p \cdot e_b \tag{22}$$

In this equation, $K_p$ denotes a proportional gain (proportional coefficient). Although, in this embodiment, the bit rate correction unit 14 calculates the correction amount baseline value $\Delta b$ as a value consisting only of a proportional term $K_p \cdot e_b$ that is proportional to the bit rate difference $e_b$, the bit rate correction unit 14 may be configured to calculate the correction amount baseline value $\Delta b$ as a sum of a proportional term, an integral term proportional to the time integral value of the bit rate difference $e_b$, and/or a derivative term proportional to the time differential value of the bit rate difference $e_b$. In this case, the bit rate correction unit 14 calculates, for example, the correction amount baseline value $\Delta b$ based on the following equation (23). In this equation, $K_i$ denotes an integral gain, and $K_d$ denotes a derivative gain.

$$\Delta b = K_p \cdot e_b + K_i \int e_b dt + K_d (de_b/dt) \tag{23}$$

The bit rate correction unit 14 calculates a bit rate b' of content data transmitted by the server device 10 from then on, based on the calculated correction amount baseline value $\Delta b$ and the following equation (24).

$$b' = b + w \cdot \Delta b \tag{24}$$

In this equation, w denotes a coefficient that varies according to the correction amount baseline value $\Delta b$ as shown in the following equation (25).

$$w = w(\Delta b) \tag{25}$$

When the correction amount baseline value $\Delta b$ is a negative value (that is, when the bit rate of content data to be transmitted by the server device 10 from then on is decreased), the coefficient w is a coefficient having a greater positive value than when the correction amount baseline value $\Delta b$ is a positive value (that is, when the bit rate of content data to be transmitted by the server device 10 from then on is increased).

In this embodiment, the coefficient w is a coefficient according to the following equations (26) and (27).

$$w = w_{up} \text{ (when } \Delta b \geq 0) \tag{26}$$

$$w = w_{down} \text{ (when } \Delta b < 0) \tag{27}$$

In the equations above, $w_{up} = 0.5$ and $w_{down} = 1$. Specifically, when the bit rate of content data to be transmitted by the server device 10 from then on is increased, the bit rate correction unit 14 uses a value obtained by halving the calculated correction amount baseline value $\Delta b$, as the correction amount, whereas when the bit rate of content data to be transmitted by the server device 10 from then on is decreased, the bit rate correction unit 14 uses the calculated correction amount baseline value $\Delta b$ directly as the correction amount. Description will be made of a reason why such a coefficient w is employed.

A time variation of the remaining reproduction time is decreased by increasing the bit rate of content data to be transmitted by the server device 10 from then on. Therefore, if the bit rate of content data to be transmitted by the server device 10 from then on is increased, the possibility of unintended interruption of reproduction of the content is increased. Thus, in this case, it will be desirable to increase the bit rate relatively slowly. In this example, therefore, when the correction amount baseline value $\Delta b$ is a positive value, the value of the coefficient w is set to $w_{up}(=0.5)$.

When the bit rate of content data to be transmitted by the server device 10 from then on is decreased, the possibility of unintended interruption of reproduction of the content is already high because the remaining reproduction time is smaller than the target value. Thus, in this case, it will be desirable to decrease the bit rate relatively rapidly. In this exmple, therefore, when the correction amount baseline value $\Delta b$ is a negative value, the value of the coefficient w is set to $w_{down}(=1)$ that is greater than $w_{up}(=0.5)$.

Since the coefficient w is set to have a value equal to or less than 1 in this example, it is possible to avoid deterioration in stability of feedback control. Although, in this example, the coefficient w is a coefficient having two different values depending on whether the correction amount baseline value $\Delta b$ is a positive value or a negative value, the coefficient w may be any arbitrary coefficient.

Thus, when the bit rate b of the content data transmitted by the server device 10 is greater than the upper limit $b_{max}$, the bit rate correction unit 14 calculates, as the correction amount, a value $K_p \cdot w \cdot e_b (= w \cdot \Delta b)$ by multiplying a value $e_b$ obtained by subtracting the bit rate b from the upper limit $b_{max}$ by a preset proportional coefficient $K_p \cdot w$.

When the bit rate b of the content data transmitted by the server device 10 is smaller than the upper limit $b_{max}$, the bit rate correction unit 14 calculates, as the correction amount, a value $K_p \cdot w \cdot e_b (=w \cdot \Delta b)$ by multiplying a value $e_b$ obtained by subtracting the bit rate b from the lower limit $b_{min}$ by a preset proportional coefficient $K_p \cdot w$.

In this embodiment, the correction amount for the bit rate is calculated according to a procedure using the equations (1) to (9), the equation (19), the equation (21), the equation (22), and the equations (24) to (27), and this procedure shall be referred to as a correction amount calculation procedure.

As described above, the correction amount reducing range determination unit 13 and the bit rate correction unit 14 calculate, based on the acquired remaining reproduction time $T_p$ and a preset target value $T_r$, a correction amount for correcting the bit rate of content data transmitted by the server device 10 so as to approximate the remaining reproduction time $T_p$ to the target value $T_r$, according to the correction amount calculation procedure based on the equations (19) and (21), and change the bit rate based on the correction amount thus calculated.

Further, when the bit rate is within the correction amount reducing range, the correction amount reducing range determination unit 13 and the bit rate correction unit 14 calculate the correction amount as zero by setting the bit rate difference $e_b$ to zero according to the equation (20). In other words, when the bit rate is within the correction amount reducing range, the correction amount reducing range determination unit 13 and the bit rate correction unit 14 calculate and obtain a correction amount that is smaller than a correction amount to be obtained when a bit rate difference $e_b$ is calculated according to the equation (19) or the equation (21) (that is, according to the above-mentioned correction amount calculation procedure).

Next, operation of the above-described delivery system 1 will be described more specifically.

Firstly, the client device 20 transmits a content transmission request containing information for specifying content data to the server device 10, in response to an instruction from a user.

On the other hand, the server device 10 transmits, upon receiving the content transmission request from the client device 20, the content data specified by the content transmission request to the client device 20 (content data transmission process).

While receiving the content data transmitted by the server device 10, the client device 20 stores received data of the content data in the storage device and reproduces content based on the stored data (content reproduction process).

Figure 5:
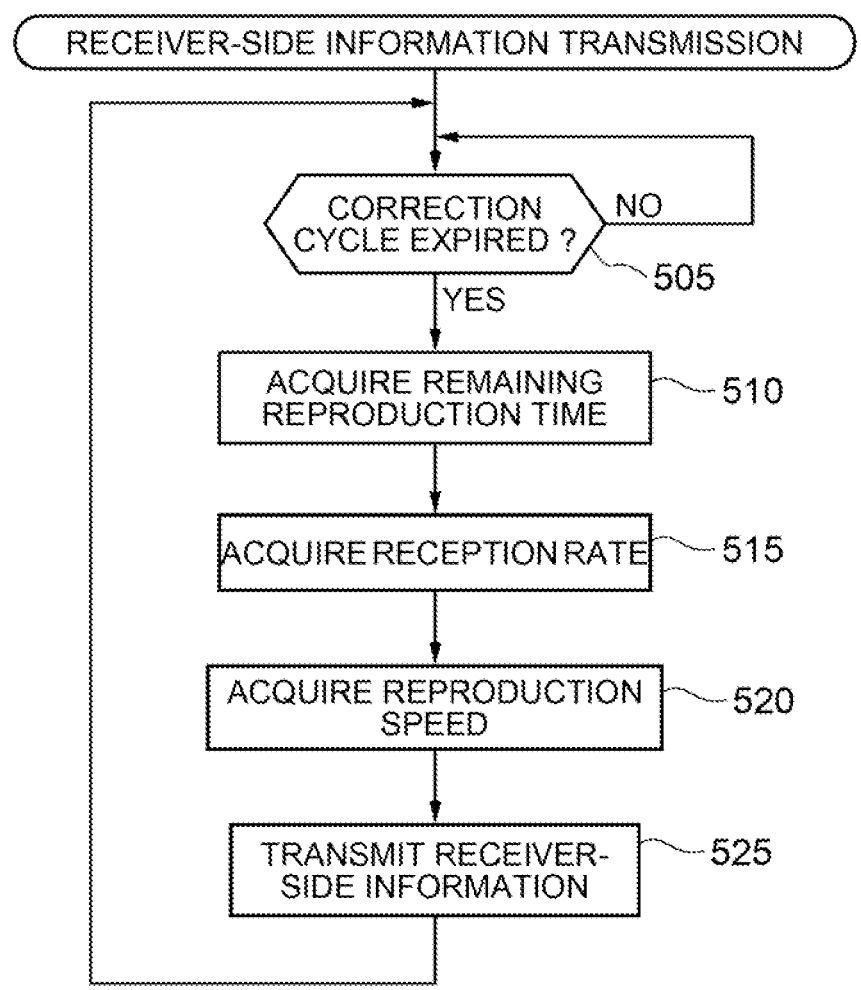
FIG. 5 is a flowchart illustrating a receiver-side information transmission program executed by a CPU of a client device according to the first embodiment of this invention.

The CPU of the client device 20 is configured to execute a receiver-side information transmission program illustrated by the flowchart of FIG. 5 at start up of the client device 20.

More specifically, after starting processing of the receiver-side information transmission program, the CPU waits in step 505 until a predetermined correction cycle expires. Once the correction cycle expires, the CPU determines "Yes" and proceeds to step 510 to acquire remaining reproduction time (remaining reproduction time acquisition process).

The CPU then acquires a reception rate (step 515, reception rate acquisition process) and, subsequently, acquires a reproduction speed (step 520, reproduction speed acquisition process). The CPU then transmits to the server device 10 receiver-side information consisting of the acquired remaining reproduction time $T_p$, the acquired reception rate v, and a reproduction speed ratio p according to the acquired reproduction speed (step 525). After that, the CPU returns to step 505 and repeats processing in steps 505 to 525.

Figure 6:
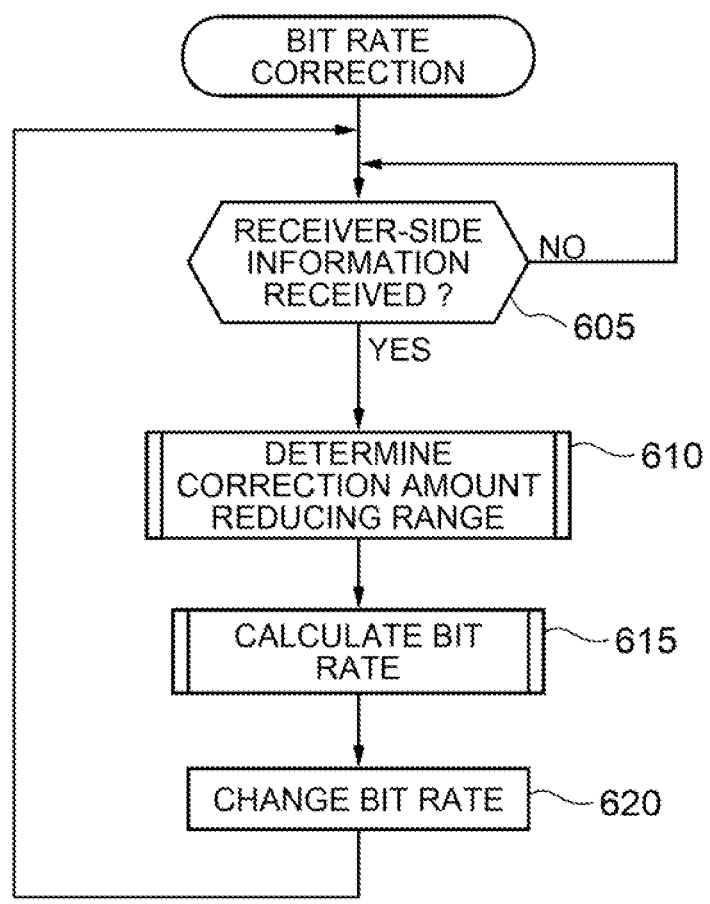
FIG. 6 is a flowchart illustrating a bit rate correction program executed by a CPU of a server device according to the first embodiment of this invention.

On the other hand, the CPU of the server device 10 is configured to execute a bit rate correction program illustrated by the flowchart of FIG. 6 at start up of the server device 10.

This processing of the bit rate correction program corresponds to a bit rate change process.

More specifically, after starting processing of the bit rate correction program, the CPU waits in step 605 until receiving receiver-side information from the client device 20. Once the server device 10 receives the receiver-side information, the CPU determines "Yes" and proceeds to step 610.

Figure 7:
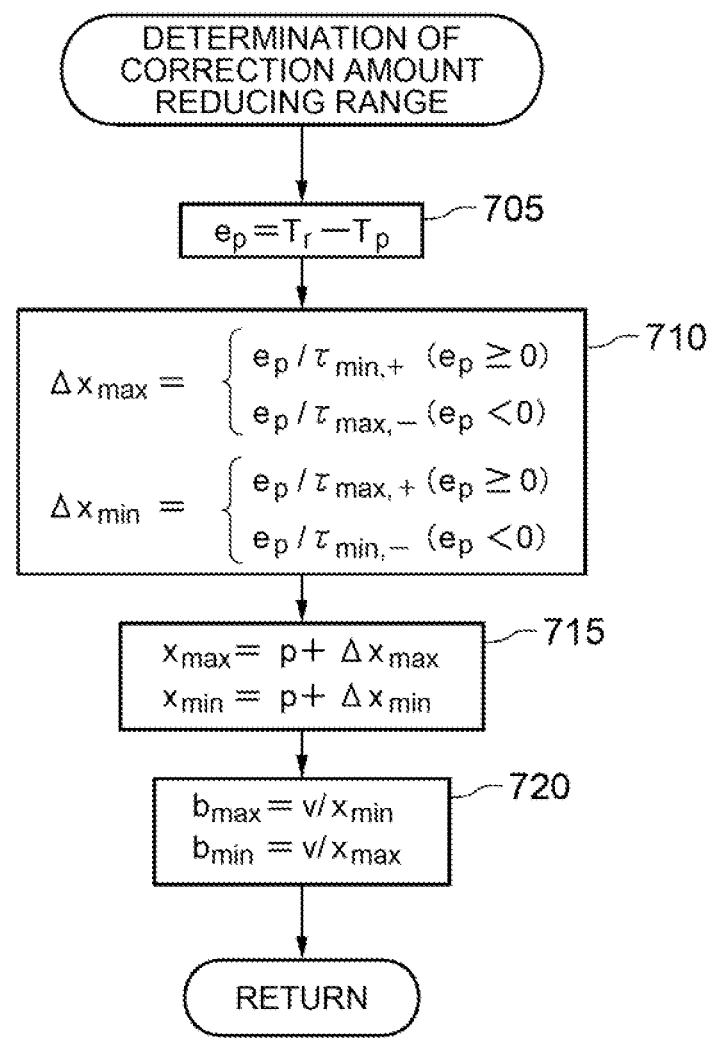
FIG. 7 is a flowchart illustrating a correction amount reducing range determination program executed by the CPU of the server device according to the first embodiment of this invention.

The CPU then executes a correction amount reducing range determination program to determine a correction amount reducing range, illustrated in the flowchart of FIG. 7.

Firstly, in step 705, the CPU calculates a remaining reproduction time difference $e_p$ based on a received remaining reproduction time $T_p$ and a preset target value $T_r$.

Subsequently, the CPU calculates time rates of change of remaining reproduction time $\Delta x_{max}$ and $\Delta x_{min}$ on the basis of the calculated remaining reproduction time difference $e_p$, and a preset first time constant in shortage $\tau_{min.+}$, a second time constant in shortage $\tau_{max.+}$, a first time constant in excess $\tau_{min.-}$ and a second time constant in excess $\tau_{max.-}$ (step 710).

The CPU then calculates media flow rates $x_{max}$, $x_{min}$ on the basis of the calculated time rates of change of remaining reproduction time $\Delta x_{max}$, $\Delta x_{min}$, and a reproduction speed ratio p contained in the received receiver-side information (step 715).

Subsequently, the CPU calculates an upper limit $b_{max}$ of the correction amount reducing range and a lower limit $b_{min}$ of the correction amount reducing range on the basis of the calculated media flow rates $x_{max}$, $x_{min}$ and a reception rate v contained in the received receiver-side information (step 720).

The CPU then terminates the execution of the correction amount reducing range determination program and proceeds to step 615 of FIG. 6.

Figure 8:
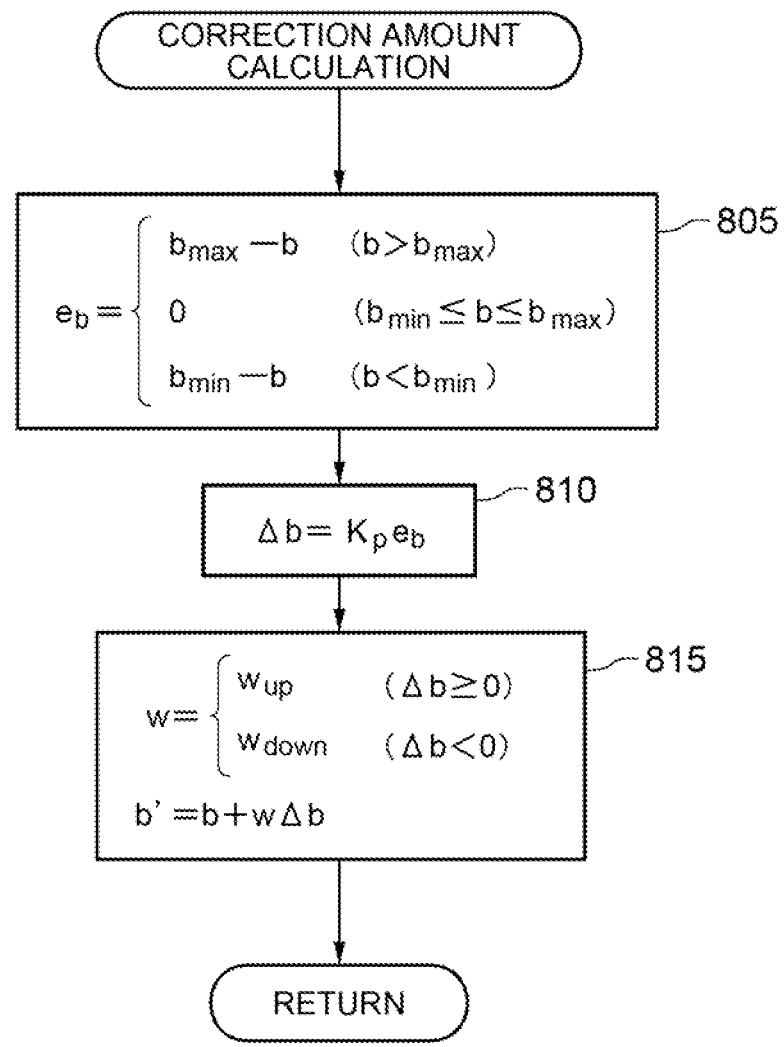
FIG. 8 is a flowchart illustrating a correction amount calculation program executed by the CPU of the server device according to the first embodiment of this invention.

Subsequently, the CPU executes a correction amount calculation program shown in the flowchart of FIG. 8 in order to calculate a correction amount.

Firstly, in step 805, the CPU calculates a bit rate difference $e_b$ based on a bit rate b of content data being currently transmitted, and the calculated upper limit $b_{max}$ and lower limit $b_{min}$ (step 805).

Subsequently, the CPU calculates a correction amount baseline value $\Delta b$ based on the calculated bit rate difference $e_b$ (step 810).

The CPU then calculates a bit rate b' of content data to be transmitted by the server device 10 from then on, on the basis of the bit rate b of the content data being currently transmitted and the calculated correction amount baseline value $\Delta b$ (step 815).

Subsequently, the CPU terminates the execution of this correction amount calculation program and proceeds to step 620 of FIG. 6. The CPU then selects a greatest bit rate among those bit rates smaller than the bit rate b' calculated in step 815 in the bit rates of the content data stored in the content data accumulator 11. The CPU then changes the bit rate of the content data being transmitted to the client device 20 to the selected bit rate.

After that, the CPU returns to step 605 and repeats the processing in steps 605 to 620.

Next, description will be made on effects provided by the delivery system 1 operating as described above, with reference to FIG. 9 and FIG. 10.

Figure 9:
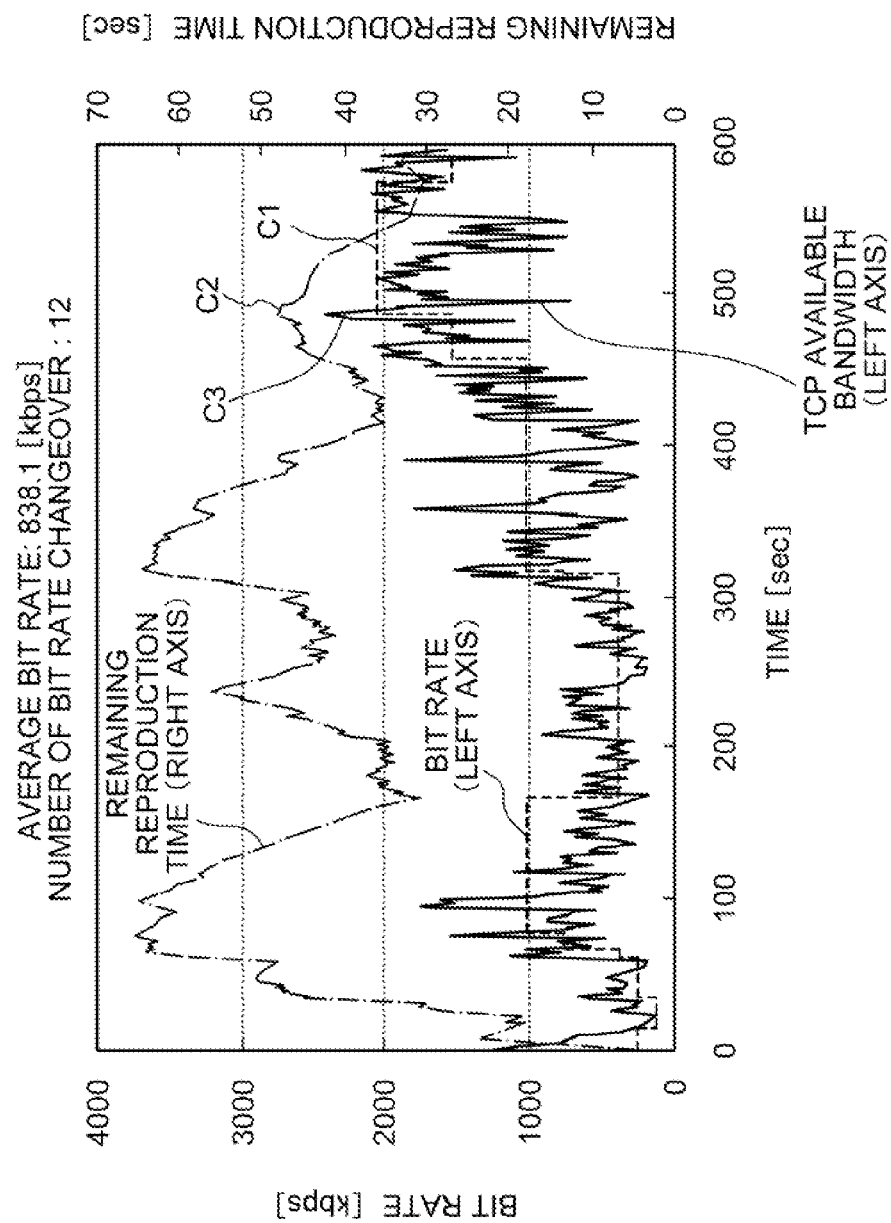
FIG. 9 is a graph illustrating a simulation result when the delivery system according to the first embodiment of this invention is used.

FIG. 9 is a graph illustrating time variation (dotted line C1) in bit rate [kbps] of video data (video bit rate) (left axis) when the video data (content data) representing video is delivered by means of the delivery system 1 according to TCP (Transmission Control Protocol), and time variation (dash-dot line C2) in remaining reproduction time [seconds] (right axis). This graph shows a result of simulation in which time variation (solid line C3) in communication speed (TCP available bandwidth) [kbps] (left axis) shown in FIG. 9 is assumed.

Figure 10:
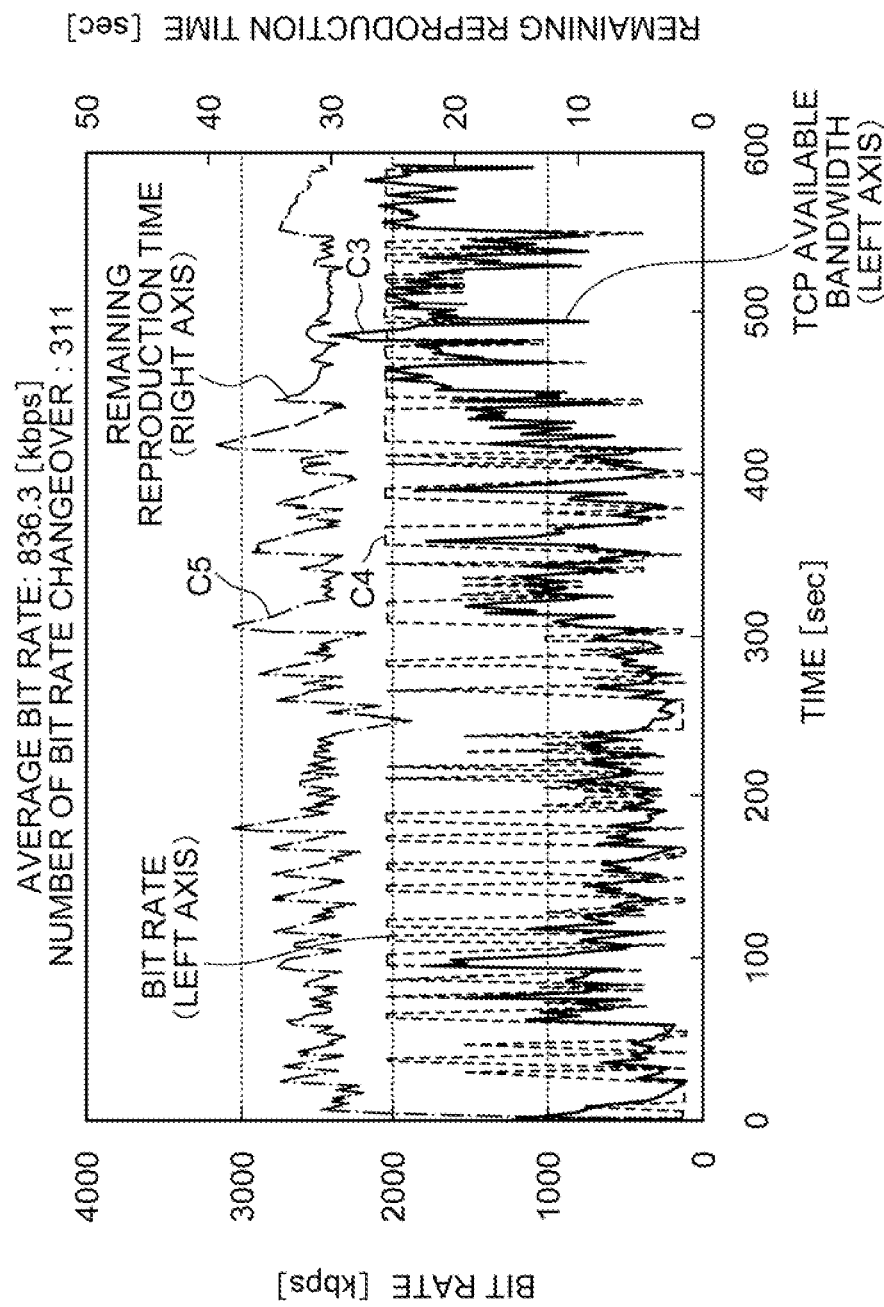
FIG. 10 is a graph illustrating a simulation result when the delivery system described in Patent Document 1 is used.

Likewise, FIG. 10 is a graph illustrating time variation (dotted line C4) in bit rate [kbps] of content data (left axis) when content data is delivered using the delivery system of the Patent Document 1 described above by means of TCP, and time variation (dash-dot line C5) in remaining reproduction time [seconds] (right axis). This graph also shows a result of simulation in which time variation (solid line C3) in communication speed [kbps] (left axis) shown in FIG. 10 is assumed.

The delivery system described in Patent Document 1 is a system configured to calculate an amount proportional to a difference between remaining reproduction time and a target value, as a correction amount for correcting a bit rate.

In the simulation above, a case is assumed, for both the delivery system 1 and the delivery system described in Patent Document 1, in which the delivery system is configured to preliminarily store content data encoded with a plurality of different bit rates, 128 [kbps], 256 [kbps], 384 [kbps], 768 [kbps], 1024 [kbps], 1536 [kbps], and 2048 [kbps] and to be able to transmit such content data.

It should be noted that the time variation in communication speed (solid line C3) shown in FIG. 10 is the same as the time variation in communication speed (solid line C3) shown in FIG. 9. This time variation in communication speed is data obtained through actual measurement in a certain wide-area wireless network for duration of 600 seconds (=10 minutes). The communication speed fluctuates relatively severely within range from several hundred [kbps] to 2 [Mbps].

In the simulation above, a case is assumed, for both the delivery system 1 and the delivery system described in Patent Document, in which the delivery system is configured to correct a bit rate of content data to be delivered, every second. Further, in the simulation above, a case is assumed, for both the delivery system 1 and the delivery system described in Patent Document 1, in which the delivery system is configured to change the bit rate of content data to be delivered to a bit rate of the seven transmittable bit rates described above, that is the greatest of those which are smaller than the calculated corrected bit rate.

Further, in the simulation above, a case is assumed, for both the delivery system 1 and the delivery system described in Patent Document 1, in which the target value for remaining reproduction time is set to 30 [seconds].

Next, description will be made by comprising the simulation result obtained using the delivery system 1 with the simulation result obtained using the delivery system described in Patent Document 1.

Attention is first focused on a number of times the bit rate is changed (number of bit rate changes). The number of bit rate changes is 12 [times] when using the delivery system 1, whereas the number of bit rate changes is 311 [times] when using the delivery system described in Patent Document 1. This means that the number of bit rate changes is much smaller when using the delivery system 1 than when using the delivery system described in Patent Document 1.

Thus, the number of times that the bit rate is changed can be decreased significantly by using the delivery system 1 in comparison when the delivery system described in Patent Document 1 is used. As a result, the use of the delivery system 1 improves the user's quality of experience in comparison with when the delivery system described in Patent Document 1 is used.

Next, attention is focused on an average bit rate that is an average value of bit rates of delivered content data. The average bit rate is 838.1 [kbps] when using the delivery system 1, whereas the average bit rate is 836.3 [kbps] when using the delivery system described in Patent Document 1. This means that the average bit rate when using the delivery system 1 is substantially equal to the average bit rate when using the delivery system described in Patent Document 1.

Thus, the use of the delivery system 1 makes it possible to deliver content data having a relatively high bit rate in the same manner as when the delivery system described in Patent Document 1 is used, even though the number of bit rate changes is small.

Next, attention is focused on remaining reproduction time. The remaining reproduction time fluctuates relatively significantly when using the delivery system 1. However, the remaining reproduction time will not become excessively short. Therefore, unintended interruption of reproduction of the content is avoided effectively.

Further, the remaining reproduction time does not fluctuate relatively significantly any more once it falls below the target value of 30 [seconds]. This is because the delivery system 1 corrects a bit rate if the remaining reproduction time falls below the target value of 30 [seconds] so that the remaining reproduction time rapidly matches the target value, whereas the delivery system 1 calculates a correction amount if the remaining reproduction time exceeds the target value of 30 [seconds] so that the fluctuation of bit rate is suppressed more effectively.

In contrast, when the delivery system described in Patent Document 1 is used, the remaining reproduction time always stays around the target value of 30 [seconds]. However, this proximity of remaining reproduction time to the target value does not affect the user's quality of experience. Therefore, it is more desirable to improve the user's quality of experience by reducing the number of changing the bit rate within such a range that reproduction of content will not be interrupted, as is done by this invention.

As described above, fluctuation of bit rate can be reduced according the first embodiment of the delivery system of this invention. More specifically, in the first embodiment, fluctuation of bit rate can be avoided by calculating the correction amount as zero when the bit rate is within the correction amount reducing range. As a result, excessive deterioration of the user's quality of experience can be avoided.

On the other hand, the delivery system 1 described above is able to prevent the remaining reproduction time from becoming excessively small or excessively great, since the delivery system 1 changes the bit rate based on a sufficiently great correction amount when the bit rate is out of the correction amount reducing range. This means that the remaining reproduction time can be maintained appropriately. As a result, unintended interruption of reproduction of the content can be prevented, and the data amount stored in the storage device of the client device 20 can be prevented from becoming excessively great.

According to the configuration described above, excessive deterioration of the user's quality of experience can be prevented, while maintaining the remaining reproduction time within an appropriate range.

Further, the first embodiment is configured to determine a correction amount reducing range based on an acquired reception rate.

This makes it possible to set the correction amount reducing range appropriately even if the reception rate fluctuates.

Further, the first embodiment is configured to determine a correction amount reducing range based on an acquired reproduction speed.

This makes it possible to set a correction amount reducing range appropriately even in a delivery system 1 including a client device 20 capable of reproducing content at any one of a plurality of reproduction speeds (e.g. reproduction speeds for slow reproduction, for normal reproduction, and for double-speed reproduction).

While the delivery system 1 according to the first embodiment is configured to determine a correction amount reducing range based on four time constants, the delivery system 1 according to a first modification of the first embodiment is configured to determine a correction amount reducing range based on two time constants.

The correction amount reducing range determination unit 13 of this delivery system 1 calculates time rates of change (time differential values) $\Delta x_{max}$, $\Delta x_{min}$ of remaining reproduction time based on the following equations (28) to (31).

$$\Delta x_{max}=e_p/\tau_{min} \text{ (when } e_p \geq 0) \tag{28}$$

$$\Delta x_{max}=e_p/\tau_{max} \text{ (when } e_p < 0) \tag{29}$$

$$\Delta x_{min}=e_p/\tau_{max} \text{ (when } e_p \geq 0) \tag{30}$$

$$\Delta x_{min}=e_p/\tau_{min} \text{ (when } e_p < 0) \tag{31}$$

In the equations above, $\tau_{min}$ denotes a first time constant (first delay time), and $\tau_{max}$ denotes a second time constant (second delay time). The first time constant $\tau_{min}$ and the second time constant $\tau_{max}$ are preliminarily stored in the storage device of the server device 10. The second time constant $\tau_{max}$ is longer than the first time constant $\tau_{min}$.

Like the first embodiment, this first modification is also able to prevent excessive deterioration of the user's quality of experience while maintaining the remaining reproduction time within an appropriate range.

While the delivery system 1 according to the first embodiment is configured to determine a correction amount reducing range based on four time constants, the delivery system 1 according to a second modification of the first embodiment is configured to determine a correction amount reducing range based on a single time constant.

The correction amount reducing range determination unit 13 of this delivery system 1 calculates a reference value $b_0$ of correction amount reducing range based on the following equations (32) to (34).

$$\Delta x_0 = e_p/\tau_0 \tag{32}$$

$$x_0 = p + \Delta x_0 \tag{33}$$

$$b_0 = v/x_0 \tag{34}$$

In these equations, $\tau_0$ denotes a time constant (delay time) and is preliminarily stored in the storage device of the server device 10.

The correction amount reducing range determination unit 13 calculates an upper limit $b_{max}$ and a lower limit $b_{min}$ of the correction amount reducing range based on a calculated reference value $b_0$ of the correction amount reducing range, a preset value $b_{th}$ [bps], and the following equations (35) and (36). The value $b_{th}$ is a positive value preliminarily stored in the storage device of the server device 10.

$$b_{max} = b_0 + b_{th} \tag{35}$$

$$b_{min} = b_0 - b_{th} \tag{36}$$

Like the first embodiment, this second modification is also able to prevent excessive deterioration of the user's quality of experience while maintaining the remaining reproduction time within an appropriate range.

The delivery system 1 according to another modification of the first embodiment may be configured to calculate an arbitrary number (herein, n) of reference values of the correction amount reducing range based on an arbitrary number (herein, m) of time constants and to determine a correction amount reducing range based on the reference values thus calculated.

When m=n, the delivery system 1 calculates m reference values for the respective m time constants by using the equations (15) and (18).

When m>n, the delivery system 1 calculates a single reference value based on the plurality of time constants. Specifically, in this case, the delivery system 1 calculates a single reference value based on the plurality of time constants and the equations (15) and (18) by changing the time constants used to calculate a single reference value according to a value of the remaining reproduction time difference $e_p(=T_r-T_p)$.

The delivery system 1 then determines a correction amount reducing range based on the calculated n reference values. When n=1, as described above in relation to the second modification, the delivery system 1 determines a correction amount reducing range based on the calculated reference values and a predetermined value $b_{th}$.

When n≥2, the delivery system 1 determines the greatest reference value among the calculated n reference values as the upper limit $b_{max}$ of the correction amount reducing range, and determines the smallest reference value among the calculated n reference values as the lower limit $b_{min}$ of the correction amount reducing range.

In this case, the delivery system 1 may be configured to calculate the bit rate difference $e_b$ based on the following equations (37) to (39).

$$e_b = F_{Sup}(b) \; (b > b_{max}) \tag{37}$$

$$e_b = F_k(b) \; (b \in B_{Lim}(k), k=1, 2, \ldots, n-2) \tag{38}$$

$$e_b = F_{Inf}(b) \; (b < b_{min}) \tag{39}$$

In these equations, $B_{Lim}(k)$ denotes a range defined by the following equation (40). The calculated n reference values are denoted by $b_r(0), b_r(1), b_r(2), \ldots,$ and $b_r(n-1)$ in the ascending order.

$$B_{Lim}(k) = \{b \mid b_r(k) \leq b \leq b_r(k+1)\} \; (k=0, 1, \ldots, n-2) \tag{40}$$

The coefficients $F_{Sup}, F_k, F_{Inf}$ are coefficients whose values become greater along with increase of the degree of deviation of the bit rate b of content data currently transmitted by the server device 10 from the correction amount reducing range.

For example, in the delivery system 1 according to the first modification, n=2 and $b_r(0)=b_{min}$ and $b_r(1)=b_{max}$. Further, $B_{Lim}(0)=\{b \mid b_{min} \leq b \leq b_{max}\}$, and $F_{Sup}(b)=b_{max}-b, F_0(b)=0, F_{Inf}(b)=b_{min}-b$.

Specifically, when the bit rate b of the content data currently transmitted by the server device 10 is within the correction amount reducing range, the bit rate difference $e_b=0$. When the bit rate b is out of the correction amount reducing range, the bit rate difference $e_b$ is defined by a difference between the bit rate b and the boundary of the correction amount reducing range.

The method of calculating a bit rate b' of content data to be transmitted from then on based on the bit rate difference $e_b$ is as described above.

The delivery system 1 according to the first embodiment calculates a time rate of change (time differential value) $\Delta x$ of remaining reproduction time by dividing a remaining reproduction time difference $e_p$ by a time constant $\tau$. The delivery system 1 according to another modification of the first embodiment may be configured to calculate the time rate of change $\Delta x$ of remaining reproduction time based on the following equation (41).

$$\Delta x = G(e_p) \tag{41}$$

In this equation, $G(e_p)$ denotes a coefficient of the remaining reproduction time difference $e_p$. For example, $G(e_p)$ may be a coefficient represented by the following equation (42).

$$G(e_p)=L_p \cdot e_p + L_i \cdot \int e_p dt + L_d \cdot (de_p/dt) \tag{42}$$

In this equation, $L_p$ denotes a proportional gain, $L_i$ denotes an integral gain, and $L_d$ denotes a derivative gain. $\int e_p dt$ denotes an integral value of time t of $e_p$ in an integration interval $[0, t]$, and $de_p/dt$ denotes a derivative value of time t of $e_p$ at the time t.

<Second Embodiment>

Next, a delivery system according to a second embodiment of this invention will be described. The delivery system according to the second embodiment is different from the delivery system according to the first embodiment by being configured to calculate a correction amount to be used by the client device to correct a bit rate. Accordingly, description will be made, focusing on such difference.

Figure 11:
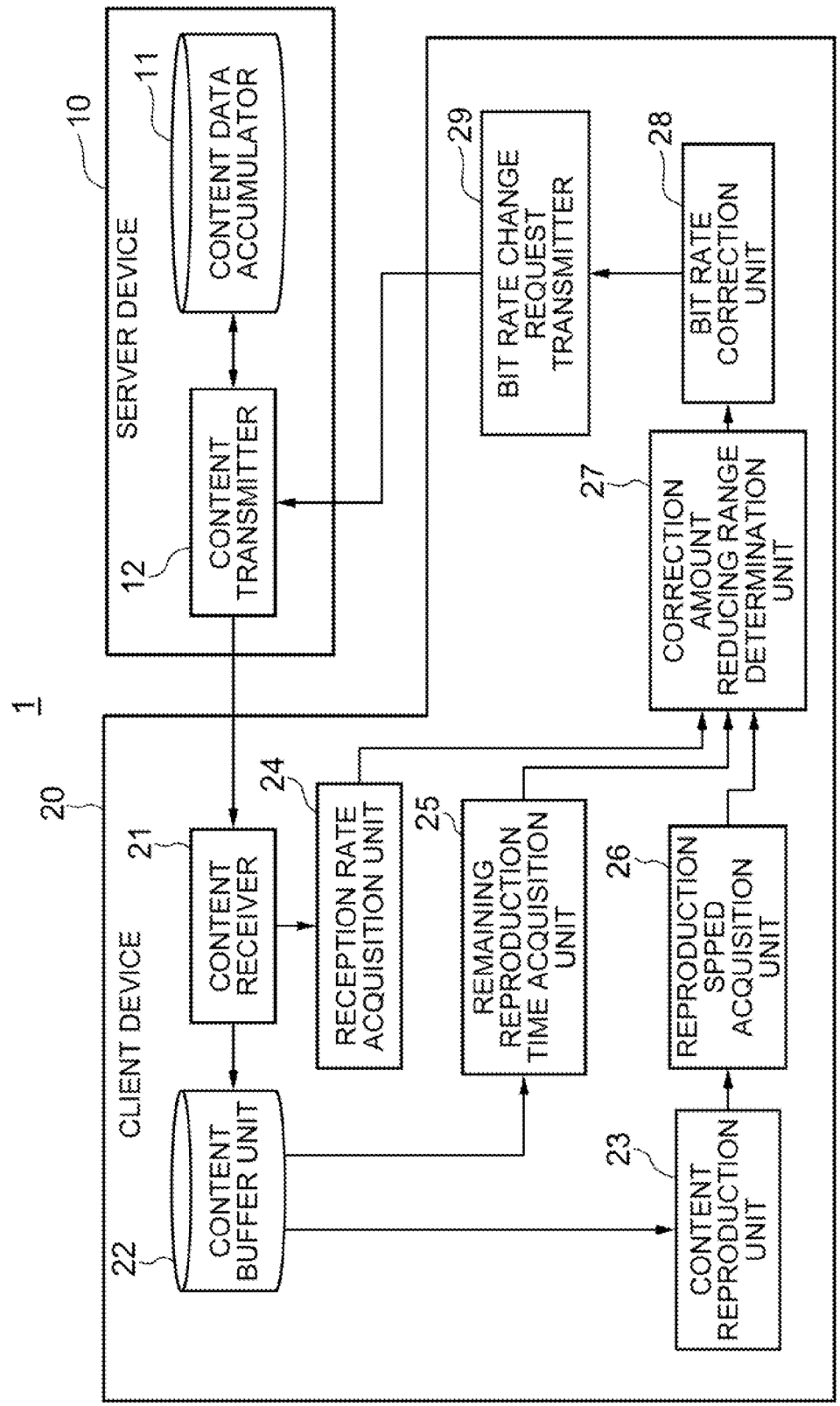
FIG. 11 is a block diagram schematically illustrating functions of a delivery system according to a second embodiment of this invention.

Functions of the server device 10 according to the second embodiment include, as shown in FIG. 11, a content data accumulator 11 and a content transmitter 12. The content data accumulator 11 and the content transmitter 12 have the same functions as those of the content data accumulator 11 and the content transmitter 12 according to the first embodiment described above.

Functions of the client device 20 according to the second embodiment include a content receiver 21, a content buffer 22, a content reproduction unit 23, a reception rate acquisition unit 24, a remaining reproduction time acquisition unit 25, a reproduction speed acquisition unit 26, a correction amount reducing range determination unit 27, a bit rate correction unit 28, and a bit rate change request transmitter 29. The correction amount reducing range determination unit 27, the bit rate correction unit 28, and the bit rate change request transmitter 29 together form bit rate change request transmission means.

The components from the content receiver 21 to the reproduction speed acquisition unit 26 have the same functions as those of the components from the content receiver 21 to the reproduction speed acquisition unit 26 according to the first embodiment. The correction amount reducing range determination unit 27 has the same function as that of the correction amount reducing range determination unit 13 according to the first embodiment. The bit rate correction unit 28 has the same function as that of the bit rate correction unit 14 according to the first embodiment.

The bit rate change request transmitter 29 transmits to the server device 10 a bit rate change request containing a bit rate b' of content data to be transmitted by the server device 10 from then on. The bit rate b' is calculated by the bit rate correction unit 28. Thus, it can be said that the bit rate change request is information for requesting change of the bit rate of content data to be transmitted by the server device 10, based on a calculated correction amount.

In this second embodiment, the content transmitter 12 is configured to transmit content data to the client device 20 according to RTP (Real-Time Transport Protocol). The bit rate change request transmitter 29 is configured to transmit a bit rate change request to the server device 10 according to RTCP (RTP Control Protocol). In this case, it is preferable for the bit rate change request transmitter 29 to use an APP (Application) packet capable of any extension.

When the content transmitter 12 transmits content data to the client device 20 using a protocol other than RTP, the bit rate change request transmitter 29 may be configured to transmit a bit rate change request to the server device 10 according to a protocol other than RTCP.

Upon receiving the bit rate change request from the client device 20, the content transmitter 12 selects, from among bit rates of content data stored in the accumulator 11, the greatest one of the bit rates which are smaller than the bit rate b' contained in the bit rate change request. The content transmitter 12 then changes the bit rate of the content data being transmitted to the client device 20 to the selected bit rate.

Like the first embodiment, the delivery system I according to this second embodiment is also able to prevent excessive deterioration of user's quality of experience while maintaining the remaining reproduction time within an appropriate range.

<Third Embodiment<

Figure 12:
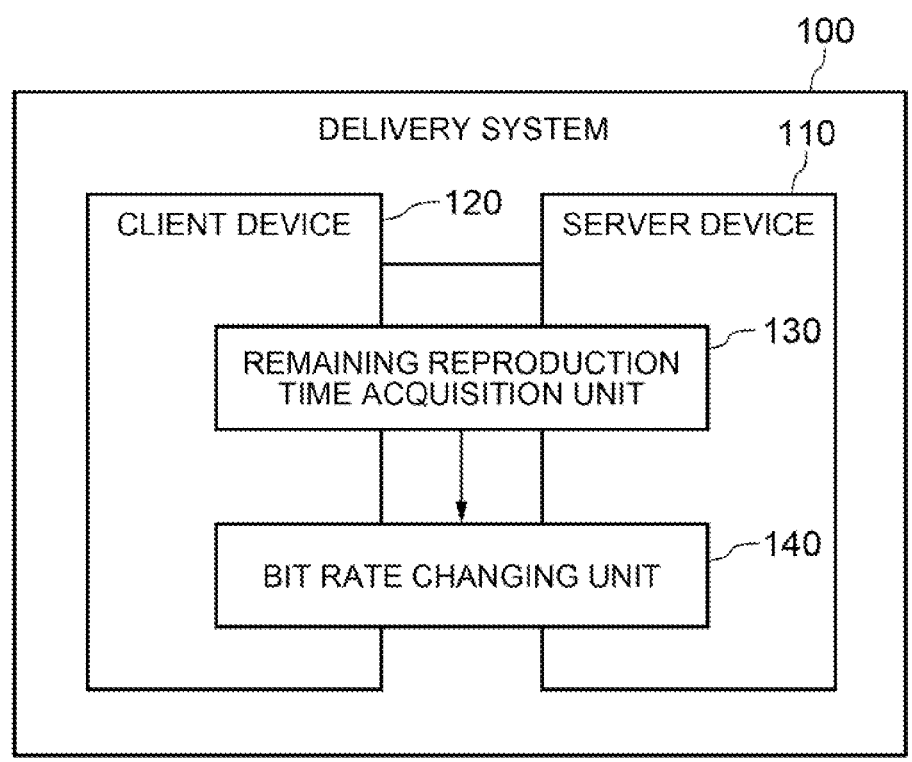
FIG. 12 is a block diagram schematically illustrating functions of a delivery system according to a third embodiment of this invention.

Next, a delivery system according to a third embodiment of this invention will be described with reference to FIG. 12.

A delivery system 100 according to the third embodiment includes a server device 110 and a client device 120 which are configured to be communicable with each other.

The server device 110 is configured to be able to transmit to the client device 120 content data which is encoded at an arbitrary bit rate of a plurality of different bit rates.

While receiving the content data transmitted by the server device 110, the client device 120 is configured to store received data in the content data in the storage device and to reproduce content based on the stored data.

Functions of the delivery system 100 includes a remaining reproduction time acquisition unit (remaining reproduction time acquisition means) 130 and a bit rate changing unit (bit rate changing means) 140.

The remaining reproduction time acquisition unit 130 acquires remaining reproduction time that is a period of time during which content can be reproduced based on a portion of the data stored in the storage device of the client device 120 that has not been reproduced.

The bit rate changing unit 140 calculates, according to a correction amount calculation procedure, a correction amount for correcting the bit rate of content data to be transmitted by the server device 110, based on the remaining reproduction time acquired by the remaining reproduction time acquisition unit 130 and a preset target value so as to approximate the remaining reproduction time to the target value. The bit rate changing unit 140 is configured to, when the bit rate is within a predetermined correction amount reducing range, calculate a correction amount that is smaller than the correction amount calculated according to the correction amount calculation procedure described above.

The bit rate changing unit 140 then changes the bit rate based on the calculated correction amount.

This enables reduction of fluctuation of bit rate. For example, when the bit rate is within the correction amount reducing range, fluctuation of bit rate can be avoided by calculating the correction amount as zero. As a result, excessive deterioration of the user's quality of experience can be avoided.

Since a bit rate is changed based on a sufficiently great correction amount when the bit rate is out of the correction amount reducing range, the delivery system 100 is able to prevent the remaining reproduction time from becoming excessively small or excessively great. This means that the remaining reproduction time can be maintained appropriately. As a result, unintended interruption of reproduction of the content can be prevented, and the data amount stored in the storage device of the client device 120 can be prevented from becoming excessively great.

The configuration as described above is able to prevent excessive deterioration of the user's quality of experience while maintaining the remaining reproduction time within an appropriate range.

In this case, it is preferable that the delivery system comprises reception rate acquisition means for acquiring a reception rate that is an amount of the content data received by the client device from the server device per unit time, and the bit rate changing means is configured to determine the correction amount reducing range based on the acquired reception rate, the acquired remaining reproduction time, and the target value.

This makes it possible to set the correction amount reducing range appropriately even if, the reception rate fluctuates.

In this case, it is preferable that the bit rate changing means is configured to narrow the correction amount reducing range as the acquired remaining reproduction time approaches the target value.

This enables the remaining reproduction time to converge to the target value more reliably.

In this case, it is preferable that the bit rate changing means is configured to calculate a first bit rate at which the remaining reproduction time matches the target value after a first delay time, and a second bit rate at which the remaining reproduction time matches the target value after a second delay time that is longer than the first delay time, determine the greater one of the calculated first bit rate and the calculated second bit rate as an upper limit of the correction amount reducing range, and determine the smaller one of the first bit rate and the second bit rate as a lower limit of the correction amount reducing range.

By setting the upper limit and the lower limit of the correction amount reducing range as described above, the correction amount reducing range which becomes narrower as the remaining reproduction time approaches the target value can be set easily.

In this case, it is preferable that the bit rate changing means is configured to calculate the correction amount, when the remaining reproduction time is smaller than the target value, so that the remaining reproduction time matches the target value earlier than when the remaining reproduction time is greater than the target value.

This makes it possible to reliably prevent unintended interruption of reproduction of content.

In this case, it is preferable that the bit rate changing means is configured to, when the remaining reproduction time is smaller than the target value, calculate as the first bit rate a bit rate at which the remaining reproduction time matches the target value after a first delay time in shortage, and calculate as the second bit rate a bit rate at which the remaining reproduction time matches the target value after a second delay time in shortage that is longer than the first delay time in shortage, and the bit rate changing means is configured to, when the remaining reproduction time is greater than the target value, calculate as the first bit rate a bit rate at which the remaining reproduction time matches the target value after a first delay time in excess, and calculate as the second bit rate a bit rate at which the remaining reproduction time matches the target value after a second delay time in excess that is longer than the first delay time in excess and longer than the second delay time in shortage.

In this case, it is preferable that the delivery system comprises reproduction speed acquisition means for acquiring a reproduction speed at which the content is reproduced, and the bit rate changing means is configured to determine the correction amount reducing range based on the acquired reproduction speed.

According to this configuration, even in a delivery system having a client device which is able to reproduce content at any one of a plurality of reproduction speeds (e.g. reproduction speeds for slow reproduction, for normal reproduction, and for double-speed reproduction), a correction amount reducing range can be set appropriately.

In this case, it is preferable that the bit rate changing means is configured to estimate, as a time differential value of the remaining reproduction time, a value obtained by dividing a value obtained by subtracting the acquired remaining reproduction time from the target value by the first delay time or the second delay time, and to calculate the first bit rate or the second bit rate based on the estimated time differential value.

In this case, it is preferable that the bit rate changing means is configured to, when a bit rate of content data being transmitted by the server device is greater than the upper limit, calculate the correction amount based on a difference between the upper limit and the bit rate.

In this case, it is preferable that the bit rate changing means is configured to, when a bit rate of content data being transmitted by the server device is greater than the upper limit, calculate as the correction amount a value obtained by multiplying a value obtained by subtracting the bit rate from the upper limit by a preset proportional coefficient.

In this case, it is preferable that the bit rate changing means is configured to, when a bit rate of content data being transmitted by the server device is smaller than the lower limit, calculate the correction amount based on a difference between the lower limit and the bit rate.

In this case, it is preferable that the bit rate changing means is configured to, when a bit rate of content data being transmitted by the server device is smaller than the lower limit, calculate as the correction amount a value obtained by multiplying a value obtained by subtracting the bit rate from the lower limit by a preset proportional coefficient.

In this case, it is preferable that the bit rate changing means is configured to set the correction amount to zero when a bit rate of content data being transmitted by the server device is within the correction amount reducing range.

Another aspect of this invention relates to a delivery method which is applicable to a delivery system including a server device configured to be able to transmit content data in which a piece of content is encoded at an arbitrary one of a plurality of different bit rates, and a client device configured to be communicable with the server device.

Further, this delivery method includes: transmitting the content data to the client device by the server device; while receiving the content data transmitted by the server device, storing received data of the content data in a storage device and reproducing the content based on the stored data, by the client device; acquiring remaining reproduction time that is a period of time during which the content can be reproduced based on a portion of the data stored in the storage device of the client device that has not been reproduced; when the bit rate is not within a predetermined correction amount reducing range, calculating a correction amount for correcting the bit rate of content data transmitted by the server device according to a predetermined correction amount calculation procedure based on the acquired remaining reproduction time and a preset target value so as to approximate the remaining reproduction time to the target value, and when the bit rate is within the correction amount reducing range, calculating a correction amount for correcting the bit rate of content data transmitted by the server device based on the acquired remaining reproduction time and the target value so as to approximate the remaining reproduction time to the target value, the correction amount having a smaller magnitude than a magnitude of the correction amount calculated according to the correction amount calculation procedure; and changing the bit rate of the content data transmitted by the server device based on the calculated correction amount.

In this case, it is preferable that the delivery method is configured to acquire a reception rate that is an amount of the content data received by the client device from the server device per unit timed, and to determining the correction amount reducing range based on the acquired reception rate, the acquired remaining reproduction time, and the target value.

In this case, it is preferable that the delivery method is configured to narrow the correction amount reducing range as the remaining reproduction time approaches the target value.

In this case, it is preferable that the delivery method is configured to calculate a first bit rate at which the remaining reproduction time matches the target value after a first delay time, and a second bit rate at which the remaining reproduction time matches the target value after a second delay time which is longer than the first delay time; and determine the greater one of the calculated first bit rate and the calculated second bit rate as an upper limit of the correction amount reducing range, and determining the smaller one of the first bit rate and the second bit rate as a lower limit of the correction amount reducing range.

Another aspect of this invention relates to a server device configured to be communicable with a client device.

This server device comprises: remaining reproduction time receiving means for receiving, from the client device, remaining reproduction time that is a period of time during which the content can be reproduced based on a portion of data stored in a storage device for storing data of the content data received by the client deice, the portion having not been reproduced by the client device; and bit rate changing means for calculating, according to a predetermined correction amount calculation procedure, a correction amount for correcting the bit rate of content data transmitted to the client device based on the received remaining reproduction time and a preset target value so as to approximate the remaining reproduction time to the target value, and changing the bit rate based on the calculated correction amount.

In addition, the bit rate changing means is configured to calculate, when the bit rate is within a predetermined correction amount reducing range, a correction amount having a smaller magnitude than a magnitude of the correction amount calculated according to the correction amount calculation procedure.

In this case, it is preferable that the server device comprises reception rate receiving means for receiving, from the client device, a reception rate that is an amount of the content data received by the client device from the server device per unit time, and the bit rate changing means is configured to determine the correction amount reducing range based on the received reception rate, the received remaining reproduction time, and the target value.

In this case, it is preferable that the bit rate changing means is configured to narrow the correction amount reducing range as the received remaining reproduction time approaches the target value.

In this case, it is preferable that the bit rate changing means is configured to calculate a first bit rate at which the remaining reproduction time matches the target value after a first delay time, and a second bit rate at which the remaining reproduction time matches the target value after a second delay time that is longer than the first delay time, determine the greater one of the calculated first bit rate and the calculated second bit rate as an upper limit of the correction amount reducing range, and determine the smaller one of the first bit rate and the second bit rate as a lower limit of the correction amount reducing range.

Another aspect of this invention relates to a program comprising instructions for causing a server device, which is configured to be communicable with a client device and to be able to transmit to the client device content data in which a piece of content is encoded at an arbitrary one of a plurality of different bit rates, to realize: remaining reproduction time receiving means for receiving, from client device, remaining reproduction time, that is a period of time during which the content can be reproduced based on a portion of the data stored in a storage device for storing data of the content data received by the client deice, the portion having not been reproduced by the client device; and bit rate changing means for calculating, according to a predetermined correction amount calculation procedure, a correction amount for correcting the bit rate of content data transmitted to the client device based on the received remaining reproduction time and a preset target value so as to approximate the remaining reproduction time to the target value, and changing the bit rate based on the calculated correction amount.

In addition, the bit rate changing means is configured to calculate, when the bit rate is within a predetermined correction amount reducing range, a correction amount having a smaller magnitude than a magnitude of the correction amount calculated according to the correction amount calculation procedure.

In this case, it is preferable that the program further comprises instructions to cause the server device to realize reception rate receiving means for receiving from the client device a reception rate that is an amount of the content data received by the client device from the server device per unit time, and the bit rate changing means is configured to determine the correction amount reducing range based on the received reception rate, the received remaining reproduction time, and the target value.

In this case, it is preferable that the bit rate changing means is configured to narrow the correction amount reducing range as the received remaining reproduction time approaches the target value.

In this case, it is preferable that the bit rate changing means is configured to calculate a first bit rate at which the remaining reproduction time matches the target value after a first delay time, and a second bit rate at which the remaining reproduction time matches the target value after a second delay time that is longer than the first delay time, determine the greater one of the calculated first bit rate and the calculated second bit rate as an upper limit of the correction amount reducing range, and determine the smaller one of the first bit rate and the second bit rate as a lower limit of the correction amount reducing range.

Another aspect of this invention relates to a client device which is configured to be communicable with a server device which is configured to be able to transmit content data in which a piece of content is encoded at an arbitrary one of a plurality of different bit rates.

Further, this client device is configured to, while receiving content data transmitted by the server device, store received data of the content data in its storage device and reproduce the content based on the stored data, and comprises: remaining reproduction time acquisition means for acquiring remaining reproduction time that is a period of time during which the content can be reproduced based on a portion of the data stored in the storage device that has not been reproduced; and bit rate change request transmission means for calculating, according to a predetermined correction amount calculation procedure, a correction amount for correcting the bit rate of the content data transmitted by the server device based on the acquired remaining reproduction time and a preset target value so as to approximate the remaining reproduction time to the target value, and transmitting, to the server deice, a bit rate change request for changing the bit rate based on the calculated correction amount.

In addition, the bit rate change request transmission means is configured to calculate, when the bit rate is within a predetermined correction amount reducing range, a correction amount having a smaller magnitude than a magnitude of the correction amount calculated according to the correction amount calculation procedure.

In this case, it is preferable that the client device comprises reception rate acquisition means for acquiring a reception rate that is an amount of the content data received by the client device from the server device per unit time, and the bit rate change request transmission means is configured to determine the correction amount reducing range based on the acquired reception rate, the acquired remaining reproduction time, and the target value.

In this case, it is preferable that the bit rate change request transmission means is configured to narrow the correction amount reducing range as the acquired remaining reproduction time approaches the target value.

In this case, it is preferable that the bit rate change request transmission means is configured to calculate a first bit rate at which the remaining reproduction time matches the target value after a first delay time, and a second bit rate at which the remaining reproduction time matches the target value after a second delay time that is longer than the first delay time, determine the greater one of the calculated first bit rate and the calculated second bit rate as an upper limit of the correction amount reducing range, and determine the smaller one of the first bit rate and the second bit rate as a lower limit of the correction amount reducing range.

Another aspect of this invention relates to a program comprising instructions for causing a client device which is configured to be communicable with a server device which is configured to be able to transmit to the client device content data in which a piece of content is encoded at an arbitrary one of a plurality of different bit rates, the client device being configured to, while receiving content data transmitted by the server device, store received data of the content data in its storage device and reproduce the content based on the stored data, to realize: remaining reproduction time acquisition means for acquiring remaining reproduction time that is a period of time during which the content can be reproduced based on a portion of the data stored in the storage device that has not been reproduced; and bit rate change request transmission means for calculating, according to a predetermined correction amount calculation procedure, a correction amount for correcting the bit rate of the content data transmitted by the server device based on the acquired remaining reproduction time and a preset target value so as to approximate the remaining reproduction time to the target value, and transmitting, to the server deice, a bit rate change request for changing the bit rate based on the calculated correction amount.

In addition, the bit rate change request transmission means is configured to calculate, when the bit rate is within a predetermined correction amount reducing range, a correction amount having a smaller magnitude than a magnitude of the correction amount calculated according to the correction amount calculation procedure.

In this case, it is preferable that the program further comprises instructions to cause the client device to realize reception rate acquisition means for acquiring a reception rate that is an amount of the content data received by the client device from the server device per unit time, and the bit rate change request transmission means is configured to determine the correction amount reducing range based on the acquired reception rate, the acquired remaining reproduction time, and the target value.

In this case, it is preferable that the bit rate change request transmission means is configured to narrow the correction amount reducing range as the acquired remaining reproduction time approaches the target value.

In this case, it is preferable that the bit rate change request transmission means is configured to calculate a first bit rate at which the remaining reproduction time matches the target value after a first delay time, and a second bit rate at which the remaining reproduction time matches the target value after a second delay time that is longer than the first delay time, determine the greater one of the calculated first bit rate and the calculated second bit rate as an upper limit of the correction amount reducing range, and determine the smaller one of the first bit rate and the second bit rate as a lower limit of the correction amount reducing range.

An inventive delivery method, server device, program, or client device having a configuration as described above has the same advantageous effects as the delivery system of this invention, and thus is able to achieve the object of the this invention described above.

Although the invention has been described with reference to the embodiments above, this invention is not limited to these embodiments. Various alterations and modifications to the configuration and particulars of the invention will occur to those skilled in the art, within a scope of the invention.

For example, in the embodiments above, the server device 10 or the client device 20 is configured to calculate a correction amount of bit rate. However, a configuration may be such that an information processing device other than the client device 20 calculates the correction amount.

Further, in the embodiments above, the correction amount is set to zero when the bit rate of content data being transmitted by the server device 10 is within the correction amount reducing range. However, a configuration may be such that the magnitude of correction amount (absolute value) is set to a value greater than zero. In this case, the delivery system 1 calculates a correction amount having a smaller magnitude than a correction amount that is calculated according to the correction amount calculation procedure which is used for calculating a correction amount when the bit rate of content data being transmitted by the server device 10 is out of the correction amount reducing range.

Although in the embodiments above, the functions of the delivery system 1 are realized by the CPU executing the program (software), they may be realized by hardware such as a circuitry.

Further, although in the embodiments above, the program is stored in the storage device, it may be stored in a computer-readable recording medium. The recording medium is a portable medium, such as a flexible disk, an optical disk, a magneto-optical disk, or a semiconductor memory.

Further, an arbitrary combination of the embodiments and modifications described above may be employed as another modification of the embodiments.

This application is based upon and claims the benefit of priority from Japanese Patent Application No. 2009-015262 filed Jan. 27, 2009, the disclosure of which is incorporated herein in its entirety by reference.

Industrial Applicability

This invention is applicable to a content delivery system or the like for delivering content data from a server device to a client device.

LIST OF REFERENCE NUMERALS

1 Delivery system
10 Server device
11 Content data accumulator
12 Content transmitter
13 Correction amount reducing range determination unit
14 Bit rate correction unit
20 Client device
21 Content receiver
22 Content buffer
23 Content reproduction unit
24 Reception rate acquisition unit
25 Remaining reproduction time acquisition unit
26 Reproduction speed acquisition unit
27 Correction amount reducing range determination unit
28 Bit rate correction unit
29 Bit rate change request transmitter
100 Delivery system
110 Server device
120 Client device
130 Remaining reproduction time acquisition unit
140 Bit rate changing unit
NW Communication network

The invention claimed is:

1. A delivery system including a server device and a client device configured to be communicable with each other,
the server device being configured to be able to transmit, to the client device, content data in which a piece of content is encoded at an arbitrary one of a plurality of different bit rates;
the client device being configured to, while receiving content data transmitted by the server device, store received data of the content data in its storage device and reproduce the content based on the stored data,
the delivery system comprising:
a remaining reproduction time acquisition unit for acquiring remaining reproduction time that is a period of time during which the content can be reproduced based on a portion of the data stored in the storage device of the client device that has not been reproduced; and
a bit rate changing unit for calculating, according to a predetermined correction amount calculation procedure, a correction amount for correcting the bit rate of the content data transmitted by the server device based on the acquired remaining reproduction time and a preset target value so as to approximate the remaining reproduction time to the target value, and changing the bit rate based on the calculated correction amount,
the bit rate changing unit being configured to calculate, when the bit rate is within a predetermined correction amount reducing range, a correction amount having a smaller magnitude than a magnitude of the correction amount calculated according to the correction amount calculation procedure.

2. The delivery system according to claim 1, wherein:
the delivery system further comprises a reception rate acquisition unit for acquiring a reception rate that is an amount of the content data received by the client device from the server device per unit time; and
the bit rate changing unit is configured to determine the correction amount reducing range based on the acquired reception rate, the acquired remaining reproduction time, and the target value.

3. The delivery system according to claim 1, wherein the bit rate changing unit is configured to narrow the correction amount reducing range as the acquired remaining reproduction time approaches the target value.

4. The delivery system according to claim 3, wherein the bit rate changing unit is configured to calculate a first bit rate at which the remaining reproduction time matches the target value after a first delay time, and a second bit rate at which the remaining reproduction time matches the target value after a second delay time that is longer than the first delay time, determine the greater one of the calculated first bit rate and the calculated second bit rate as an upper limit of the correction amount reducing range, and determine the smaller one of the first bit rate and the second bit rate as a lower limit of the correction amount reducing range.

5. The delivery system according to claim 4, wherein the bit rate changing unit is configured to estimate, as a time differential value of the remaining reproduction time, a value obtained by dividing a value obtained by subtracting the acquired remaining reproduction time from the target value by the first delay time or the second delay time, and to calculate the first bit rate or the second bit rate based on the estimated time differential value.

6. The delivery system according to claim 1, wherein the bit rate changing unit is configured to calculate the correction amount, when the remaining reproduction time is smaller than the target value, so that the remaining reproduction time matches the target value earlier than when the remaining reproduction time is greater than the target value.

7. The delivery system according to claim 6, wherein the bit rate changing unit is configured to, when the remaining reproduction time is smaller than the target value, calculate as the first bit rate a bit rate at which the remaining reproduction time matches the target value after a first delay time in shortage, and calculate as the second bit rate a bit rate at which the remaining reproduction time matches the target value after a second delay time in shortage that is longer than the first delay time in shortage, and the bit rate changing unit is configured to, when the remaining reproduction time is greater than the target value, calculate as the first bit rate a bit rate at which the remaining reproduction time matches the target value after a first delay time in excess, and calculate as the second bit rate a bit rate at which the remaining reproduction time matches the target value after a second delay time in excess that is longer than the first delay time in excess and longer than the second delay time in shortage.

8. The delivery system according to claim 1, wherein:
the delivery system further comprises a reproduction speed acquisition unit for acquiring a reproduction speed at which the content is reproduced by the client device; and
the bit rate changing unit is configured to determine the correction amount reducing range based on the acquired reproduction speed.

9. The delivery system according to claim 1, wherein the bit rate changing unit is configured to, when a bit rate of content data being transmitted by the server device is greater than the upper limit, calculate the correction amount based on a difference between the upper limit and the bit rate.

10. The delivery system according to claim 9, wherein the bit rate changing unit is configured to, when a bit rate of content data being transmitted by the server device is greater than the upper limit, calculate as the correction amount a value obtained by multiplying a value obtained by subtracting the bit rate from the upper limit by a preset proportional coefficient.

11. The delivery system according to claim 1, wherein the bit rate changing unit is configured to, when a bit rate of content data being transmitted by the server device is smaller than the lower limit, calculate the correction amount based on a difference between the lower limit and the bit rate.

12. The delivery system according to claim 11, wherein the bit rate changing unit is configured to, when a bit rate of content data being transmitted by the server device is smaller than the lower limit, calculate as the correction amount a value obtained by multiplying a value obtained by subtracting the bit rate from the lower limit by a preset proportional coefficient.

13. The delivery system according to claim 1, wherein the bit rate changing unit is configured to set the correction amount to zero when a bit rate of content data being transmitted by the server device is within the correction amount reducing range.

14. A delivery method applicable to a delivery system including a server device configured to be able to transmit content data in which a piece of content is encoded at an arbitrary one of a plurality of different bit rates, and a client device configured to be communicable with the server device, the delivery method comprising:
    transmitting the content data to the client device by the server device;
    while receiving the content data transmitted by the server device, storing received data of the content data in a storage device and reproducing the content based on the stored data, by the client device;
    acquiring remaining reproduction time that is a period of time during which the content can be reproduced based on a portion of the data stored in the storage device of the client device that has not been reproduced;
    when the bit rate is not within a predetermined correction amount reducing range, calculating a correction amount for correcting the bit rate of the content data transmitted by the server device according to a predetermined correction amount calculation procedure based on the acquired remaining reproduction time and a preset target value so as to approximate the remaining reproduction time to the target value, and when the bit rate is within the correction amount reducing range, calculating a correction amount for correcting the bit rate of the content data transmitted by the server device based on the acquired remaining reproduction time and the target value so as to approximate the remaining reproduction time to the target value, the correction amount having a smaller magnitude than a magnitude of the correction amount calculated according to the correction amount calculation procedure; and
    changing the bit rate of the content data transmitted by the server device based on the calculated correction amount.

15. The delivery method according to claim 14, comprising:
    acquiring a reception rate that is an amount of the content data received by the client device from the server device per unit timed; and
    determining the correction amount reducing range based on the acquired reception rate , the acquired remaining reproduction time, and the target value.

16. The delivery method according to claim 14, wherein the correction amount reducing range is narrowed as the acquired remaining reproduction time approaches the target value.

17. The delivery method according to claim 16, comprising:
    calculating a first bit rate at which the remaining reproduction time matches the target value after a first delay time, and a second bit rate at which the remaining reproduction time matches the target value after a second delay time which is longer than the first delay time; and
    determining the greater one of the calculated first bit rate and the calculated second bit rate as an upper limit of the correction amount reducing range, and determining the smaller one of the first bit rate and the second bit rate as a lower limit of the correction amount reducing range.

18. A server device configured to be communicable with a client device and configured to be able to transmit to the client device content data in which a piece of content is encoded at an arbitrary one of a plurality of different bit rates, the server device comprising:
    a remaining reproduction time receiving unit for receiving, from the client device, remaining reproduction time that is a period of time during which the content can be reproduced based on a portion of data stored in a storage device for storing data of the content data received by the client device, the portion having not been reproduced by the client device; and
    a bit rate changing unit for calculating, according to a predetermined correction amount calculation procedure, a correction amount for correcting the bit rate of content data transmitted to the client device based on the received remaining reproduction time and a preset target value so as to approximate the remaining reproduction time to the target value, and changing the bit rate based on the calculated correction amount,
    the bit rate changing unit being configured to calculate, when the bit rate is within a predetermined correction amount reducing range, a correction amount having a smaller magnitude than a magnitude of the correction amount calculated according to the correction amount calculation procedure.

19. The server device according to claim 18, further comprising:
    a reception rate receiving unit for receiving, from the client device, a reception rate that is an amount of the content data received by the client device from the server device per unit time,
    the bit rate changing unit being configured to determine the correction amount reducing range based on the received reception rate, the received remaining reproduction time, and the target value.

20. The server device according to claim 18, wherein the bit rate changing unit is configured to narrow the correction amount reducing range as the received remaining reproduction time approaches the target value.

21. The server device according to claim 20, wherein the bit rate changing unit is configured to calculate a first bit rate at which the remaining reproduction time matches the target value after a first delay time, and a second bit rate at which the remaining reproduction time matches the target value after a second delay time that is longer than the first delay time, determine the greater one of the calculated first bit rate and the calculated second bit rate as an upper limit of the correction amount reducing range, and determine the smaller one of the first bit rate and the second bit rate as a lower limit of the correction amount reducing range.

22. A non-transitory computer-readable medium storing a program comprising instructions for causing a server device, which is configured to be communicable with a client device and to be able to transmit to the client device content data in which a piece of content is encoded at an arbitrary one of a plurality of different bit rates, to realize:
- a remaining reproduction time receiving unit for receiving, from client device, remaining reproduction time that is a period of time during which the content can be reproduced based on a portion of the data stored in a storage device for storing data of the content data received by the client device, the portion having not been reproduced by the client device; and
- a bit rate changing unit for calculating, according to a predetermined correction amount calculation procedure, a correction amount for correcting the bit rate of content data transmitted to the client device based on the received remaining reproduction time and a preset target value so as to approximate the remaining reproduction time to the target value, and changing the bit rate based on the calculated correction amount,
- the bit rate changing unit being configured to calculate, when the bit rate is within a predetermined correction amount reducing range, a correction amount having a smaller magnitude than a magnitude of the correction amount calculated according to the correction amount calculation procedure.

23. The non-transitory computer-readable medium storing a program according to claim 22, wherein:
- the program further comprises instructions for causing the server device to realize a reception rate receiving unit for receiving from the client device a reception rate that is an amount of the content data received by the client device from the server device per unit time; and
- the bit rate changing unit is configured to determine the correction amount reducing range based on the received reception rate, the received remaining reproduction time, and the target value.

24. The non-transitory computer-readable medium storing a program according to claim 22, wherein the bit rate changing unit is configured to narrow the correction amount reducing range as the received remaining reproduction time approaches the target value.

25. The non-transitory computer-readable medium storing a program according to claim 24, wherein the bit rate changing unit is configured to calculate a first bit rate at which the remaining reproduction time matches the target value after a first delay time, and a second bit rate at which the remaining reproduction time matches the target value after a second delay time that is longer than the first delay time, determine the greater one of the calculated first bit rate and the calculated second bit rate as an upper limit of the correction amount reducing range, and determine the smaller one of the first bit rate and the second bit rate as a lower limit of the correction amount reducing range.

26. A client device configured to be communicable with a server device which is configured to be able to transmit content data in which a piece of content is encoded at an arbitrary one of a plurality of different bit rates,
- the client device being configured to, while receiving content data transmitted by the server device, store received data of the content data in its storage device and reproduce the content based on the stored data, and comprising:
- a remaining reproduction time acquisition unit for acquiring remaining reproduction time that is a period of time during which the content can be reproduced based on a portion of the data stored in the storage device that has not been reproduced; and
- a bit rate change request transmission unit for calculating, according to a predetermined correction amount calculation procedure, a correction amount for correcting the bit rate of the content data transmitted by the server device based on the acquired remaining reproduction time and a preset target value so as to approximate the remaining reproduction time to the target value, and transmitting, to the server device, a bit rate change request for changing the bit rate based on the calculated correction amount;
- the bit rate change request transmission unit being configured to calculate, when the bit rate is within a predetermined correction amount reducing range, a correction amount having a smaller magnitude than a magnitude of the correction amount calculated according to the correction amount calculation procedure.

27. The client device according to claim 26, wherein:
- the client device comprises a reception rate acquisition unit for acquiring a reception rate that is an amount of the content data received by the client device from the server device per unit time; and
- the bit rate change request transmission unit is configured to determine the correction amount reducing range based on the acquired reception rate, the acquired remaining reproduction time, and the target value.

28. The client device according to claim 26, wherein the bit rate change request transmission unit is configured to narrow the correction amount reducing range as the acquired remaining reproduction time approaches the target value.

29. The client device according to claim 28, wherein the bit rate change request transmission unit is configured to calculate a first bit rate at which the remaining reproduction time matches the target value after a first delay time, and a second bit rate at which the remaining reproduction time matches the target value after a second delay time that is longer than the first delay time, determine the greater one of the calculated first bit rate and the calculated second bit rate as an upper limit of the correction amount reducing range, and determine the smaller one of the first bit rate and the second bit rate as a lower limit of the correction amount reducing range.

30. A non-transitory computer-readable medium storing a program comprising instructions for causing a client device which is configured to be communicable with a server device which is configured to be able to transmit to the client device content data in which a piece of content is encoded at an arbitrary one of a plurality of different bit rates, the client device being configured to, while receiving content data transmitted by the server device, store received data of the content data in its storage device and reproduce the content based on the stored data, to realize:
- a remaining reproduction time acquisition unit for acquiring remaining reproduction time that is a period of time during which the content can be reproduced based on a portion of the data stored in the storage device that has not been reproduced; and
- a bit rate change request transmission unit for calculating, according to a predetermined correction amount calculation procedure, a correction amount for correcting the bit rate of the content data transmitted by the server device based on the acquired remaining reproduction time and a preset target value so as to approximate the remaining reproduction time to the target value, and transmitting, to the server device, a bit rate change request for changing the bit rate based on the calculated correction amount,
- the bit rate change request transmission unit being configured to calculate, when the bit rate is within a predetermined correction amount reducing range, a correction amount having a smaller magnitude than a magnitude of the correction amount calculated according to the correction amount calculation procedure.

31. The non-transitory computer-readable medium storing a program according to claim 30, wherein:
the program further comprises instructions to cause the client device to realize a reception rate acquisition unit for acquiring a reception rate that is an amount of the content data received by the client device from the server device per unit time; and
the bit rate change request transmission unit is configured to determine the correction amount reducing range based on the acquired reception rate, the acquired remaining reproduction time, and the target value.

32. The non-transitory computer-readable medium storing a program according to claim 30, wherein the bit rate change request transmission unit is configured to narrow the correction amount reducing range as the acquired remaining reproduction time approaches the target value.

33. The non-transitory computer-readable medium storing a program according to claim 32, wherein the bit rate change request transmission unit is configured to calculate a first bit rate at which the remaining reproduction time matches the target value after a first delay time, and a second bit rate at which the remaining reproduction time matches the target value after a second delay time that is longer than the first delay time, determine the greater one of the calculated first bit rate and the calculated second bit rate as an upper limit of the correction amount reducing range, and determine the smaller one of the first bit rate and the second bit rate as a lower limit of the correction amount reducing range.

34. A delivery system comprising a server device and a client device configured to be communicable with each other,
the server device being configured to be able to transmit, to the client device, content data in which a piece of content is encoded at an arbitrary one of a plurality of different bit rates;
the client device being configured to, while receiving content data transmitted by the server device, store received data of the content data in its storage device and reproduce the content based on the stored data,
the delivery system comprising:
remaining reproduction time acquisition means for acquiring remaining reproduction time that is a period of time during which the content can be reproduced based on a portion of the data stored in the storage device of the client device that has not been reproduced; and
bit rate changing means for calculating, according to a predetermined correction amount calculation procedure, a correction amount for correcting the bit rate of the content data transmitted by the server device based on the acquired remaining reproduction time and a preset target value so as to approximate the remaining reproduction time to the target value, and changing the bit rate based on the calculated correction amount,
the bit rate changing means being configured to calculate, when the bit rate is within a predetermined correction amount reducing range, a correction amount having a smaller magnitude than a magnitude of the correction amount calculated according to the correction amount calculation procedure.

35. A server device configured to be communicable with a client device and configured to be able to transmit to the client device content data in which a piece of content is encoded at an arbitrary one of a plurality of different bit rates, the server device comprising:
remaining reproduction time receiving means for receiving, from the client device, remaining reproduction time, that is a period of time during which the content can be reproduced based on a portion of data stored in a storage device for storing data of the content data received by the client device, the portion having not been reproduced by the client device; and
bit rate changing means for calculating, according to a predetermined correction amount calculation procedure, a correction amount for correcting the bit rate of content data transmitted to the client device based on the received remaining reproduction time and a preset target value so as to approximate the remaining reproduction time to the target value, and changing the bit rate based on the calculated correction amount,
the bit rate changing means being configured to calculate, when the bit rate is within a predetermined correction amount reducing range, a correction amount having a smaller magnitude than a magnitude of the correction amount calculated according to the correction amount calculation procedure.

36. A client device configured to be communicable with a server device which is configured to be able to transmit content data in which a piece of content is encoded at an arbitrary one of a plurality of different bit rates,
the client device being configured to, while receiving content data transmitted by the server device, store received data of the content data in its storage device and reproduce the content based on the stored data, and comprising:
remaining reproduction time acquisition means for acquiring remaining reproduction time that is a period of time during which the content can be reproduced based on a portion of the data stored in the storage device that has not been reproduced; and
bit rate change request transmission means for calculating, according to a predetermined correction amount calculation procedure, a correction amount for correcting the bit rate of the content data transmitted by the server device based on the acquired remaining reproduction time and a preset target value so as to approximate the remaining reproduction time to the target value, and transmitting, to the server device, a bit rate change request for changing the bit rate based on the calculated correction amount;
the bit rate change request transmission means being configured to calculate, when the bit rate is within a predetermined correction amount reducing range, a correction amount having a smaller magnitude than a magnitude of the correction amount calculated according to the correction amount calculation procedure.

* * * * *